(12) United States Patent
Chen et al.

(10) Patent No.: US 12,301,720 B2
(45) Date of Patent: May 13, 2025

(54) COMPUTING SYSTEMS AND METHODS FOR PROTECTING APPLICATION PROGRAMMING INTERFACES WITH TWO-FACTOR AUTHENTICATION

(71) Applicant: Discover Financial Services, Riverwoods, IL (US)

(72) Inventors: Hao Chen, Palatine, IL (US); George Mitry, Mundelein, IL (US)

(73) Assignee: Discover Financial Services, Riverwoods, IL (US)

( * ) Notice: Subject to any disclaimer, the term of this patent is extended or adjusted under 35 U.S.C. 154(b) by 312 days.

(21) Appl. No.: 18/151,730

(22) Filed: Jan. 9, 2023

(65) Prior Publication Data
US 2024/0235835 A1    Jul. 11, 2024

(51) Int. Cl.
*H04L 9/32* (2006.01)
(52) U.S. Cl.
CPC .......... *H04L 9/3213* (2013.01); *H04L 9/3236* (2013.01); *H04L 9/3247* (2013.01)
(58) Field of Classification Search
CPC .... H04L 9/3213; H04L 9/3236; H04L 9/3247
See application file for complete search history.

(56) References Cited

U.S. PATENT DOCUMENTS

| | | | |
|---|---|---|---|
| 10,509,914 B1 | 12/2019 | Desai et al. | |
| 11,687,378 B2 * | 6/2023 | Bhargava | H04L 67/1019 726/5 |
| 11,973,870 B1 * | 4/2024 | Mehta | G06F 21/1014 |
| 12,166,884 B2 * | 12/2024 | Bhasin | H04L 9/3213 |
| 2010/0100945 A1 | 4/2010 | Ozzie et al. | |
| 2014/0331240 A1 | 11/2014 | Zhao et al. | |
| 2015/0248543 A1 | 9/2015 | Yoshinari | |
| 2015/0295930 A1 | 10/2015 | Dixon et al. | |
| 2017/0330233 A1 | 11/2017 | Bruno et al. | |
| 2019/0065724 A1 | 2/2019 | Dudley et al. | |
| 2019/0253894 A1 | 8/2019 | Bykampadi et al. | |

(Continued)

OTHER PUBLICATIONS

Okta Developer | Self-Service Registration. Taken from archive.org on Oct. 19, 2021. Webpage: <https://web.archive.org/web/20211019021441/https: //developer.okta.com/docs/guides/oie-embedded-sdk-use-case-self-reg/java/main/>. 2021. 18 pages.

(Continued)

*Primary Examiner* — Azizul Choudhury
(74) *Attorney, Agent, or Firm* — Lee Sullivan Shea & Smith LLP

(57) ABSTRACT

In order to extend an OAuth 2.0 framework in a way that an application programming interface (API) is to be protected with two-factor authentication, an API provider may be presented with a set of options for different types of second authentication factors that can be used to carry out the two-factor authentication for the API, and then after the API provider selects its desired type of second authentication factor, an OAuth resource endpoint or an OAuth token endpoint may function to perform a second-factor authentication of each client application attempting to access the API based on a second authentication factor of the type selected by the API provider. Other comparable technology for protecting APIs may be extended to allow for two-factor authentication in a similar manner.

16 Claims, 10 Drawing Sheets

(56) References Cited

U.S. PATENT DOCUMENTS

| | | | |
|---|---|---|---|
| 2019/0325129 A1 | 10/2019 | Wang et al. | |
| 2021/0192039 A1 | 6/2021 | Pihur et al. | |
| 2022/0210196 A1* | 6/2022 | Parekh | H04L 63/0227 |
| 2022/0311616 A1 | 9/2022 | Moore et al. | |
| 2022/0376933 A1 | 11/2022 | Guabtni et al. | |
| 2023/0308432 A1 | 9/2023 | Smolny et al. | |
| 2024/0163273 A1 | 5/2024 | Fabjanski | |

OTHER PUBLICATIONS

International Searching Authority. International Search Report and Written Opinion issued in International Application No. PCT/US2024/010909, mailed on May 14, 2024, 13 pages.

Elessev, Alexander. How to Implement Two-Factor Authentication in a Spring Boot Oauth Server? Part 1: Configuration. Sep. 14, 2021, pp. 5 [online], [retrieved on May 27, 2022]. Retrieved from the internet <URL:https://dzone.com/articles/how-to-implement-2fa-spring-boot-oauth-server-part-1>.

Elessev, Alexander. How to Implement Two-Factor Authentication in a Spring Boot Oauth Server? Part 2: Under the Hood. Sep. 14, 2021, pp. 10 [online], [retrieved on May 27, 2022]. Retrieved from the internet <UR:https://dzone.com/articles/how-to-implement-2fa-spring-boot-oauth-server-part-2>.

National Security Agency. Cybersecurity Information. Oct. 2020, pp. 10 [online], [retrieved on May 26, 2022]. Retrieved from the internet <URL:chrome-extension://efaidnbmnnnibpcajpcglclefindmkaj/https://media.defense.gov/2020/Sep/22/2002502665/-1/-1/0/CSI_MULTIFACTOR_AUTHENTICATION_SOLUTIONS_UOO17091520.PDF>.

SecSign. Oauth 2.0 Integration. Copyright 2022, pp. 17 [online], [retrieved on May 27, 2022]. Retrieved from the internet <URL: https://www.secsign.com/developers/oauth-2-two-factor-authentication/>.

Rixon. Vaultless Tokenization and the Right to be Forgotten. Sep. 2021, pp. 10 [online], [retrieved on May 27, 2022]. Retrieved from the internet <URL:chrome-extension://efaidnbmnn-nibpcajpcglclefindmkaj/https://rixontechnology.com/wp-content/uploads/2021/09/Rixon-RTBF-White-Paper_8-10-20-1.pdf>.

* cited by examiner

COMPUTING SYSTEMS AND METHODS FOR PROTECTING APPLICATION PROGRAMMING INTERFACES WITH TWO-FACTOR AUTHENTICATION

BACKGROUND

Business organizations are increasingly utilizing application programming interfaces (APIs) as a means for enabling client applications to access resources within an organization's computing platform. For example, an organization may utilize an API to expose certain resources within the organization's computing platform to client applications running on end-user devices such as mobile phones or personal computers (e.g., native or web applications). As another example, a first organization may utilize an API to expose certain resources within the first organization's computing platform to a client application of a second organization (e.g., a business partner), such as a server-based application within the second organization's computing platform. As yet another example, an organization may utilize an API to expose certain resources hosted on one server within the organization's computing platform to a client application hosted by another server within the organization's computing platform. Other examples of scenarios where an API may be utilized to expose resources within an organization's computing platform to a client application are possible as well.

OVERVIEW

Disclosed herein is new software technology that extends an OAuth 2.0 framework (or any other comparable technology for protecting APIs) in a way that enables API providers to protect APIs with two-factor authentication. In accordance with the disclosed technology, an API provider may be presented with a set of options for different types of second authentication factors that can be used to carry out two-factor authentication for an API and may select a desired type of second authentication factor. Further, an OAuth 2.0 entity (e.g., an OAuth resource endpoint, an OAuth token endpoint, etc.) may function to perform a second-factor authentication of each client application attempting to access the API based on a second authentication factor of the type selected by the API provider.

In one aspect, the disclosed technology may take the form of a method carried out by a computing platform that involves (1) causing a first end-user device associated with an application programming interface (API) provider to display a first interface for registering an API that exposes resources of the API provider and is to be protected using two-factor authentication, wherein the first interface presents a set of options for two or more types of authentication factors that are available for use as a second authentication factor of the two-factor authentication for the API, (2) receiving, from the first end-user device associated with the API provider, registration information for the API that includes an indication of the API provider's selection of a given type of authentication factor that is to be used as the second authentication factor of the two-factor authentication for the API, (3) causing a second end-user device associated with an API consumer to display a second interface for registering a client application that is to access resources exposed by the API, (4) receiving, from the second end-user device associated with the API consumer, registration information for the client application, (5) registering first-factor credential information for the client application that enables access to the API, and (6) registering second-factor credential information for the client application that enables access to the API, wherein the second-factor credential information is of a type that corresponds to the API provider's selection of the given type of authentication factor that is to be used as the second authentication factor of the two-factor authentication for the API.

In another aspect, the disclosed technology may take the form of a method carried out by a computing platform that involves (1) providing a resource endpoint for a given application programming interface (API) that is protected by two-factor authentication, (2) receiving, from a computing system running a client application via one or more data networks, a request to access one or more resources exposed by the given API, wherein the request includes (i) an access token that was previously issued to the client application as a result of a successful first-factor authentication of the client application, and (ii) a second authentication factor that encodes second-factor credential information for the client application, wherein the second authentication factor is of a given type that was selected by a provider of the given API during registration of the given API from a set of options for two or more types of authentication factors that were presented to the provider as being available for use as the second authentication factor of the two-factor authentication for the given API, (3) after receiving the request: (i) validating the access token and (ii) based on the second authentication factor, performing a second-factor authentication of the client application, (4) and if the access token is validated and the second-factor authentication of the client application is successful, authorizing the received request to access the one or more resources exposed by the given API.

In yet another aspect, the disclosed technology may take the form of a method carried out by a computing platform that involves (1) providing a token endpoint for a given application programming interface (API) that is protected by two-factor authentication, wherein a second authentication factor of the two-factor authentication is of a given type that was selected by a provider of the given API during registration of the given API from a set of options for two or more types of authentication factors that were presented to the provider as being available for use as the second authentication factor of the two-factor authentication for the given API, (2) receiving, from a computing system running a client application via one or more data networks, a request for an access token that enables the client application to access one or more resources exposed by the given API, wherein the request includes (i) a first authentication factor that encodes first-factor credential information for the client application and (ii) a second authentication factor that encodes second-factor credential information for the client application, (3) based on the first authentication factor, performing a first-factor authentication of the client application, (4) based on the second authentication factor, performing a second-factor authentication of the client application, (5) if both the first-factor authentication and the second-factor authentication are successful, generating the access token that enables the client application to access the one or more resources exposed by the given API, and (6) transmitting the access token to the computing system running the client application via the one or more data networks.

Further, disclosed herein is a computing platform comprising at least one network interface, at least one processor, at least one non-transitory computer-readable medium, and program instructions stored on the at least one non-transitory computer-readable medium that are executable by the at least one processor such that the computing platform is configured to carry out the functions disclosed herein, including but not limited to the functions of the foregoing methods.

Further yet, disclosed herein is at least one non-transitory computer-readable medium that is provisioned with program instructions that, when executed by at least one processor, cause a computing platform to carry out the functions disclosed herein, including but not limited to the functions of the foregoing methods.

One of ordinary skill in the art will appreciate these as well as numerous other aspects in reading the following disclosure.

Figure 1A:
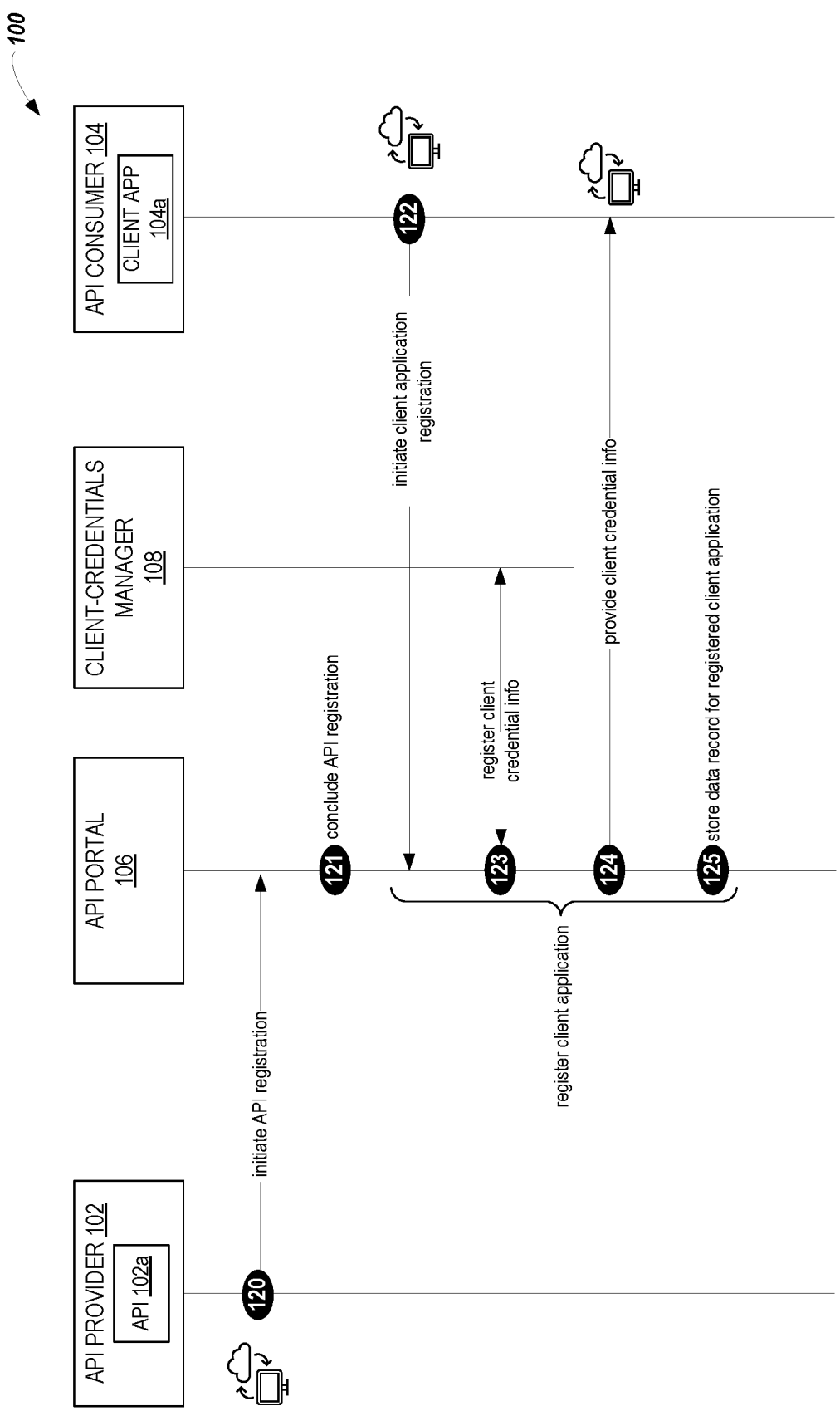
FIG. 1A depicts a flow diagram of an example registration process for one example implementation of an OAuth 2.0 framework.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, organizations are increasingly utilizing application programming interfaces (APIs) as a means for enabling client applications to access resources within an organization's computing platform. For example, an organization may utilize an API to expose certain resources within the organization's computing platform to client applications running on end-user devices such as mobile phones or personal computers (e.g., native or web applications). As another example, a first organization may utilize an API to expose certain resources within the first organization's computing platform to a client application of a second organization (e.g., a business partner), such as a server-based application within the second organization's computing platform. As yet another example, an organization may utilize an API to expose certain resources hosted on one server within the organization's computing platform to a client application hosted by another server within the organization's computing platform. Other examples of scenarios where an API may be utilized to expose resources within an organization's computing platform to a client application are possible as well.

In most cases, when an organization utilizes an API to expose resources within its computing platform, the organization also secures the API with technology that governs which client applications are authorized to access which resources via the organization's API and ensures that the organization's resources cannot be accessed by unauthorized client applications. One such technology is OAuth 2.0, which is an "Open Authorization" framework for governing a client application's access to an organization's API-exposed resources in a safe and secure manner. In an OAuth 2.0 framework, a client application that wishes to access a given resource that is exposed by an organization's API must first obtain an "access token" for the API, which represents the client application's authorization to take certain actions with respect to certain resources that are exposed by the organization's API, and may then include the obtained access code in its request to access the given resource via the API.

The OAuth 2.0 framework defines several different flows for obtaining an access token for an API, referred to as "grant types," which are suited for different use cases. For instance, in a scenario where the client application takes the form of an end-user application (e.g., a web application or a native application such as a mobile app), then an "authorization code," "resource owner password credentials," or "implicit" type of grant (among others) may be implemented, depending on the use case. In these grant types, the access token is issued to the client application based on authentication of credentials for the end user, such as the end user's pre-registered login credentials for accessing the organization's resources, and the client application may then use the access token to access resources exposed by the organization's API.

Alternatively, in a scenario where the client application takes the form of a server-based application (e.g., a back-end service, daemon, command-line utility, service account, or the like) rather than an end-user application, then a "client credentials" type of grant may be implemented. In a client credentials grant type, the access token is issued to the client application based on authentication of credentials for the client application itself rather than the credentials of an end user, which is sometimes referred to as machine-to-machine (or "M2M") authentication. In this way, the client application is able to obtain an access token for an organization's API and then use the access token to access resources exposed by the organization's API without any involvement from an end user, which is beneficial when the client application takes the form of a server-based application rather than an end-user application. A client credentials grant type could be utilized to authenticate and authorize a client application in other scenarios as well.

For purposes of illustration, the disclosed technology is at times described below in the context of a client credentials grant type of the OAuth 2.0 framework, but it should be understood that the disclosed technology is applicable to other grant types as well.

In order to utilize the client credentials grant type of the OAuth 2.0 framework to govern access to resources exposed by an API, the organization that is providing the API and the organization that wishes to access resources via the API typically begin by engaging in a registration process. These organizations may be referred to herein as an "API provider" and an "API consumer," respectively. (In line with the discussion above, it should be understood that the API provider and the API consumer could either be different organizations or the same organization, depending on the scenario). During this registration process, the API provider may register an API that exposes certain resources hosted by the API provider and is to be protected using the OAuth 2.0 framework's client credentials grant type, and the API consumer may register a client application that is to call the API in order to access certain resources that are exposed by the API provider's API.

FIG. 1A depicts one example of a registration process 100 that may be carried out for one example implementation of the OAuth 2.0 framework that utilizes the client credentials grant type. As shown in FIG. 1A, the example registration process 100 may involve an example API provider 102, an example API consumer 104, an API portal 106, and a client-credentials manager 108.

In general, the example API provider 102 may be any organization that is utilizing an API to expose certain resources hosted by the API provider 102 (e.g., data, back-end services, etc.) and wishes to protect the API using the OAuth 2.0 framework's client credentials grant type, and the example API consumer 104 may be any organization that intends to configure a client application to call the API in order to access certain resources exposed by the API provider's API. In this respect, the API provider 102 and API consumer 104 could be different organizations, such as business partners, or could be the same organization (e.g., in a scenario where the client application 104a is a server-based application that is to be hosted by the same organization that is providing the API 102a).

Further, the API portal 106 may comprise any computing system that is configured to facilitate registration of APIs and client applications that are to utilize the client credentials grant type of the OAuth 2.0 framework in order to govern access to API-exposed resources. In practice, this API portal 106 may be operated either by the API provider 102 or by a third-party organization that offers a platform for interfacing API providers with API consumers, but other implementations are possible as well.

Further yet, the API portal 106 of FIG. 1A may be configured to interact with a client-credentials manager 108, which may comprise a functional system that serves to manage client-credential information for client applications that register for APIs via the API portal 106. In practice, this functional system could be integrated with the API portal 106 itself or could be implemented on a separate computing system from the API portal 106, which may comprise another computing system operated by the same organization that operates the API portal 106 (e.g., the API provider 102 or a third-party orchestrator) or a computing system operated by a separate organization that provides client-credential management services to organizations that operate API portals, among other possibilities.

As shown in FIG. 1A, the registration process 100 may begin with the API provider 102 interacting with the API portal 106 in order to register an API 102a that exposes certain resources hosted by the API provider 102. For instance, as shown at step 120, this registration of the API provider's API 102a may be initiated by a representative of the API provider 102 (e.g., a developer, an administrator, etc.), who may use an end-user device to access the API portal 106 over one or more data networks (e.g., via a web application, a mobile application, or the like) and then submit a request to register the API 102a that includes certain information about the API 102a, examples of which may include identifying information for the API 102a (e.g., a name, a unique API identifier such as a uniform resource identifier (URI), etc.) and certain configuration settings for the API 102a (e.g., permission settings that define a set of possible scopes that can be used by the API). Additionally, although not shown, the API portal 106 may also generate certain information that facilitates registration of the API 102a.

After the API provider 102 has supplied registration information for the API 102a as described above, then at step 121, the registration process for the new API 102a may conclude with the API portal 106 verifying the API 102a and storing a data record for the newly-registered API 102a, which may include the information about the API 102a that was supplied by the API provider's representative during registration and perhaps also other information about the API 102a that is generated by the API portal 106 itself as part of the registration process (e.g., additional identifiers and/or configuration settings).

Next, the API consumer 104 may interact with the API portal 106 in order to register a client application 104a that will call the registered API 102a in order to access certain resources that are hosted by the example API provider 102 and exposed via the API 102a. For instance, as shown at step 122, this registration of the API consumer's client application 104a may be initiated by a representative of the API consumer 104 (e.g., a developer, an administrator, etc.), who may use an end-user device to access the API portal 106 over one or more data networks (e.g., via a web application, a mobile application, or the like) and then submit a request to register the client application 104a that includes certain information about the client application 104a, examples of which may include identifying information for the client application 104a (e.g., an application name, an application type, an application URI, developer name, etc.), an identification of the API(s) to be accessed by the client application 104a (e.g., API 102a), and certain configuration settings for the client application 104a (e.g., permission settings that define a set of scopes requested by the client application for the identified API(s), etc.). In practice, the representative of the API consumer 104 may also need to enter pre-registered login credentials for the API portal 106 prior to (or together with) submitting the request to register the client application 104a, which may then be utilized by the API portal 106 to verify that the API consumer 104 has the appropriate permissions to register a client application that will be requesting access to resources exposed by the API 102a. Additionally or alternatively, after receiving the request to register the client application 104a, the API portal 106 may engage in an initial approval process in order to verify that the API consumer 104 has the appropriate permissions to register a client application that will be requesting access to resources exposed by the API 102*a*, which could optionally involve interaction with the API provider 102.

As shown at step 123, after receiving the request to register the client application 104*a* that will be calling the API 102*a*, the API portal 106 may interact with the client-credentials manager 108 in order to register client-credential information for the client application 104*a*, which may then be used to authenticate the client application 104*a* when it attempts to access resources via the API 102*a*. This client-credential information typically takes the form of a unique client identifier (typically referred to as a "client ID" or "API key") and a client secret for the client application 104*a*, although other client-credential information is possible as well.

To facilitate this functionality for registering client-credential information for the client application 104*a*, the API portal 106 may send a request to the client-credentials manager 108 for new client-credential information for the client application 104*a*, and the client-credentials manager 108 may in turn function to (i) generate the client-credential information for the client application 104*a*, (ii) provide a copy of the client-credential information for the client application 104*a* back to the API portal 106, and also (iii) store that client-credential information for future access by the API consumer 104 and/or the OAuth endpoints discussed below.

After registering the client-credential information for the client application 104*a*, the API portal 106 may then cause the registered client-credential information for the client application 104*a* to be presented to the API consumer 104, so that the API consumer 104 can then utilize the client-credential information when configuring the client application 104*a* to call the API 102*a*. For instance, as shown at step 124, the API portal 106 may send a communication to the end-user device of the API consumer's representative over one or more data networks that enables and causes the end-user device to present the API consumer's representative with the obtained client-credential information for the client application 104*a*. In practice, this function of presenting the API consumer's representative with the registered client-credential information for the client application 104*a* may involve either displaying the client-credential information itself on the end-user device's screen or presenting the API consumer's representative with a software object (e.g., a link) that can be used to access and view the client-credential information, among other possibilities. The API consumer's representative may then record that information for future use by the API consumer 104.

As shown at step 125, the registration process for the new client application 104*a* may also involve the API portal 106 storing a data record for the newly-registered client application 104*a*, which may include the information about the client application 104*a* that was supplied by the API consumer's representative during registration and perhaps also other information about the client application 104*a* that was obtained by the API portal 106 as part of the registration process, such as additional identifiers, configuration settings, and/or a copy of the client-credential information for the client application 104*a* (although in practice the source of truth for the client-credential information will typically be maintained by the client-credentials manager).

The process for registering APIs and client applications in an implementation of the OAuth 2.0 framework that utilizes a client credentials grant type may take various other forms as well.

Figure 1B:
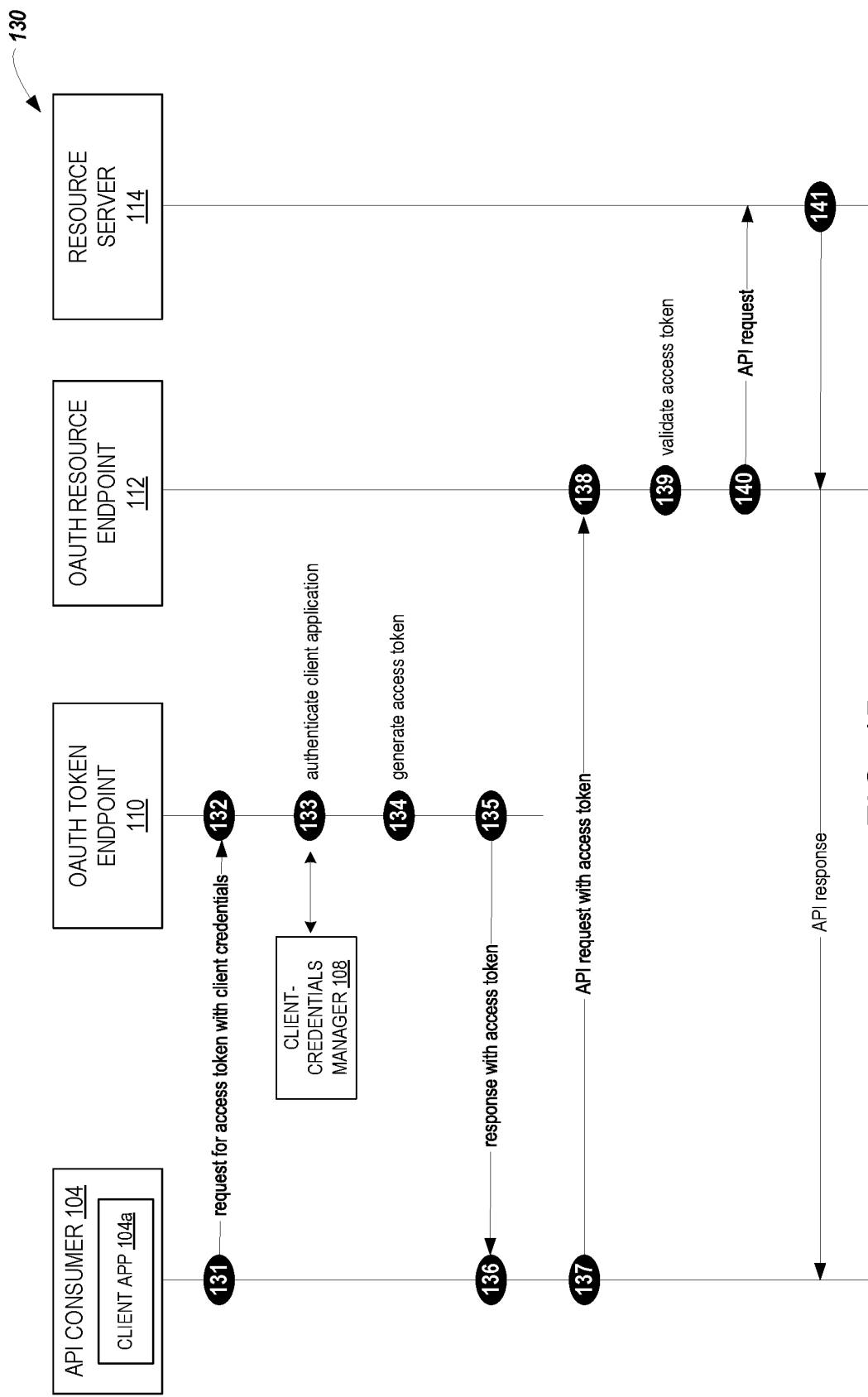
FIG. 1B depicts a flow diagram of an example process for authenticating and authorizing a client application to access a resource exposed by an API in accordance with one example implementation of the OAuth 2.0 framework.

Once the registration process for the API 102*a* and the client application 104*a* has been completed, the API consumer 104 can then configure the client application 104*a* to begin requesting access to resources exposed by the API 102*a* in accordance with the OAuth 2.0 framework. FIG. 1B depicts one possible example of a process 130 that may be carried out in accordance with an implementation of the OAuth 2.0 framework that utilizes the client credentials grant type in order to authenticate and authorize the client application 104*a* to access a resource exposed by the API 102*a* of the API provider 102. As shown in FIG. 1B, the example process 130 may involve (i) the registered client application 104*a*, which may be running on a computing system of the API consumer 104, (ii) an OAuth token endpoint 110, which may be running on a computing system that is configured to serve as an OAuth "authorization server," (iii) an OAuth resource endpoint 112, which may be running on a computing system that is configured to serve as a proxy (or entry point) for the registered API 102*a*, and (iv) the computing system of the API provider 102 that is hosting the resources exposed by the registered API 102*a*, which is shown in FIG. 1B as a resource server 114.

In practice, these computing systems may interact with one another via one or more data networks, examples of which may include Personal Area Networks (PANs), Local Area Networks (LANs), Wide Area Networks (WANs) such as the Internet or cellular networks, and/or cloud networks, among other possibilities. Further, in practice, the computing systems running the OAuth token endpoint 110 and the OAuth resource endpoint 112 could be operated either by the API provider 102 or by a third-party organization that serves to perform OAuth endpoint operations on behalf of the API provider 102, among other possibilities.

As shown in FIG. 1B, the example process 130 may begin at step 131 with the client application 104*a* (i) generating a request for an access token that encodes the client-credential information for the client application 104*a* (e.g., the client ID and client secret) and then (ii) causing that request to be sent from the computing system of the API consumer 104 to the OAuth token endpoint 110 running on the OAuth authorization server. In this respect, the manner in which the client application 104*a* encodes its client-credential information into the request for the access token may take various forms. For instance, in one implementation where the client-credential information takes the form of a client ID and client secret, the client application 104*a* may include the client ID as well as the client secret itself within the request for the access token. In another implementation where the client-credential information takes the form of a client ID and client secret, the client application may use the client secret to generate a JSON Web Token (JWT) and then include the JWT (along with the client ID) in the request for the access token. The client application 104*a* may utilize other methods for encoding its client-credential information into the request for the access token as well.

Turning to step 132, the OAuth token endpoint 110 may receive the request for the access token. At step 133, the OAuth token endpoint 110 may then use the client-credential information that is encoded within the request to authenticate the client application 104*a*. This function may take various forms, which may depend on the manner in which the client-credential information for the client application 104*a* has been encoded into the request for the access token. For instance, in an implementation where the client-credential information takes the form of a client ID and client secret and the client secret itself is included within the request, the function of authenticating the client application 104*a* may involve interacting with the client-credentials manager 108 in order to validate the received client secret (e.g., by comparing the received client ID and client secret against the client ID and client secret that were generated and stored by the client-credentials manager 108 during the registration of the client application 104*a*). Alternatively, in an implementation where the client-credential information takes the form of a client ID and client secret and the client secret is encoded within the request in the form of a JWT, the function of authenticating the client application may involve validating the received JWT (e.g., by verifying that the JTW was signed using the client secret that was generated and stored by the client-credentials manager 108 during the registration of the client application 104*a*). The function of authenticating the client application may take other forms as well.

If the client application 104*a* is successfully authenticated, then the OAuth token endpoint 110 may (i) at step 134, generate an access token that represents an authorization for the client application 104*a* to access certain resources that are exposed by the registered API 102*a*, and (ii) at step 135, cause the generated access token to be sent from the OAuth authorization server back to the client application 104*a* running on the API consumer's computing system. In practice, this generated access token may take various forms, examples of which may include a JWT type of access token (which may be encoded with a given set of token information) or an opaque type of access token (which may be cross-referenced with a given set of token information), among other possibilities.

At step 136, the client application 104*a* may receive the access token that was generated by the OAuth token endpoint 110. In turn, at step 137, client application 104*a* may (i) generate an API request to access a resource that is hosted by the API provider's resource server 114 and exposed by the API 102*a*, where the request includes the access token, and then (ii) cause that API request to be sent from the API consumer's computing system to the OAuth resource endpoint 112 running on the computing system serving as the proxy for the API 102*a*.

At step 138, the OAuth resource endpoint 112 may receive the API request from the client application 104*a*. In turn, at step 139, the OAuth resource endpoint 112 may validate the access token. This function of validating the access token may take various forms, which may depend in part on the form of the access token (e.g., whether the access token comprises a JWT type of token, an opaque type of token, or some other type of token). For instance, in an implementation where the access token comprises a JWT type of token that was signed by the OAuth token endpoint 110, the function of validating the access token may involve verifying the signature of the JWT token as well as other claims included within the JWT token (e.g., audience, scopes, expiration time, etc.). Alternatively, in an implementation where the access token comprises an opaque type of token, the function of validating the access token may involve interacting with an introspection endpoint on the OAuth authorization server to obtain token information corresponding to the opaque token and then verifying certain aspects of that information (e.g., active state, scopes, expiration time, etc.). The function of validating the access token may take other forms as well.

If the access token is successfully validated by the OAuth resource endpoint 112, then at step 140, the OAuth resource endpoint 112 may relay the API request to the resource server 114, and at step 141, the resource server 114 may send an API response back to the client application 104*a* (via the OAuth resource endpoint 112) that provides the client application 104*a* with the requested access to the resource. On the other hand, if the access token cannot be successfully validated by the OAuth resource endpoint 112, the OAuth resource endpoint 112 may deny the API request and cause an API response to be sent back to the client application 204*a* indicating that the API request has been denied.

Implementations of the OAuth 2.0 framework based on other grant types may similarly involve the use of (i) an OAuth token endpoint that functions to authorize the client application based on client-credentials information and issue an access token based on that authorization and (ii) an OAuth resource endpoint that functions to validate the access token and govern access to API-exposed resources based on that validation, including but not limited to implementations of the OAuth 2.0 framework that utilize an authorization code or resource owner password credentials grant type.

Thus, the OAuth 2.0 framework provides an API provider with a secure way to allow authorized client applications to gain limited access to resources exposed by the API provider's API(s) while at the same time preventing unauthorized client applications from accessing the resources exposed by the API provider's API(s). However, the OAuth 2.0 framework also has several shortcomings that limit how it can be used to secure an API.

One such shortcoming of the OAuth 2.0 framework is that it only involves one-factor authentication of a client application and fails to provide an API provider with any capability to utilize multi-factor authentication—let alone allows an API provider to choose between different types of multi-factor authentication options—which may not provide a sufficient level of security for some uses cases. For example, in a scenario where the API at issue exposes financial data and/or back-end services related to financial transactions, the one-factor authentication carried out by the OAuth 2.0 framework may not provide a sufficient level of security, in which case the organization providing the API may be forced to expend time and resources developing its own, customized solution to secure its API. Additionally, this lack of any capability to utilize multi-factor authentication is compounded by the fact that the full set of client-credential information utilized for authentication of client applications is typically stored persistently at an entity such as an API portal and/or a client-credentials manager, which exposes the API portal and/or the client-credentials manager as a common attack surface that is often targeted by bad actors attempting to gain unauthorized access to an API. For example, if a bad actor is able to gain access to the client-credential information that is persisted at the API portal or the client-credentials manager for a client application that has previously been authorized to access an API, the bad actor may then be able to use that client-credential information to impersonate the client application and thereby gain access to resources without being authorized to do so.

For these and other reasons, there is a need for technology that enhances the security of the OAuth 2.0 framework (and any other comparable technologies for protecting APIs) in a way that allows it to be utilized by API providers for a wider range of APIs, including but not limited to APIs that expose highly-sensitive data and/or services.

To address this need, disclosed herein is new technology that extends the OAuth 2.0 framework (and any other comparable technologies for protecting APIs) in a way that enables an API provider to protect its APIs with two-factor authentication. In accordance with the disclosed technology, an API provider may be presented with a set of options for different types of second authentication factors that can be used to carry out two-factor authentication for an API—which allows the API provider to flexibly choose which two-factor authentication approach is most appropriate for the use case on an API-by-API basis—and then after the API provider selects its desired type of second authentication factor, one of the entities within the OAuth 2.0 framework (e.g., the OAuth resource endpoint or OAuth token endpoint) may function to perform a second-factor authentication of each client application attempting to access the API based on a second authentication factor of the type selected by the API provider. Along with extending the OAuth 2.0 framework to enable two-factor authentication, the disclosed technology also provides various implementation options for further enhancing the security of the OAuth 2.0 framework, including but not limited to enabling the use of vaultless (e.g., not persisted) client-credential information to perform the second-factor authentication. In this way, the disclosed technology overcomes the above-described shortcomings of the OAuth 2.0 framework (and any other comparable technologies for protecting APIs).

In order to utilize the disclosed two-factor authentication extension of the OAuth 2.0 framework, an API provider and an API consumer may begin by engaging in a registration process during which the API provider registers a given API that exposes certain resources hosted by the API provider and the API consumer registers a given client application that will be calling the given API in order to access certain resources that are exposed by the API provider's API.

Figure 2A:
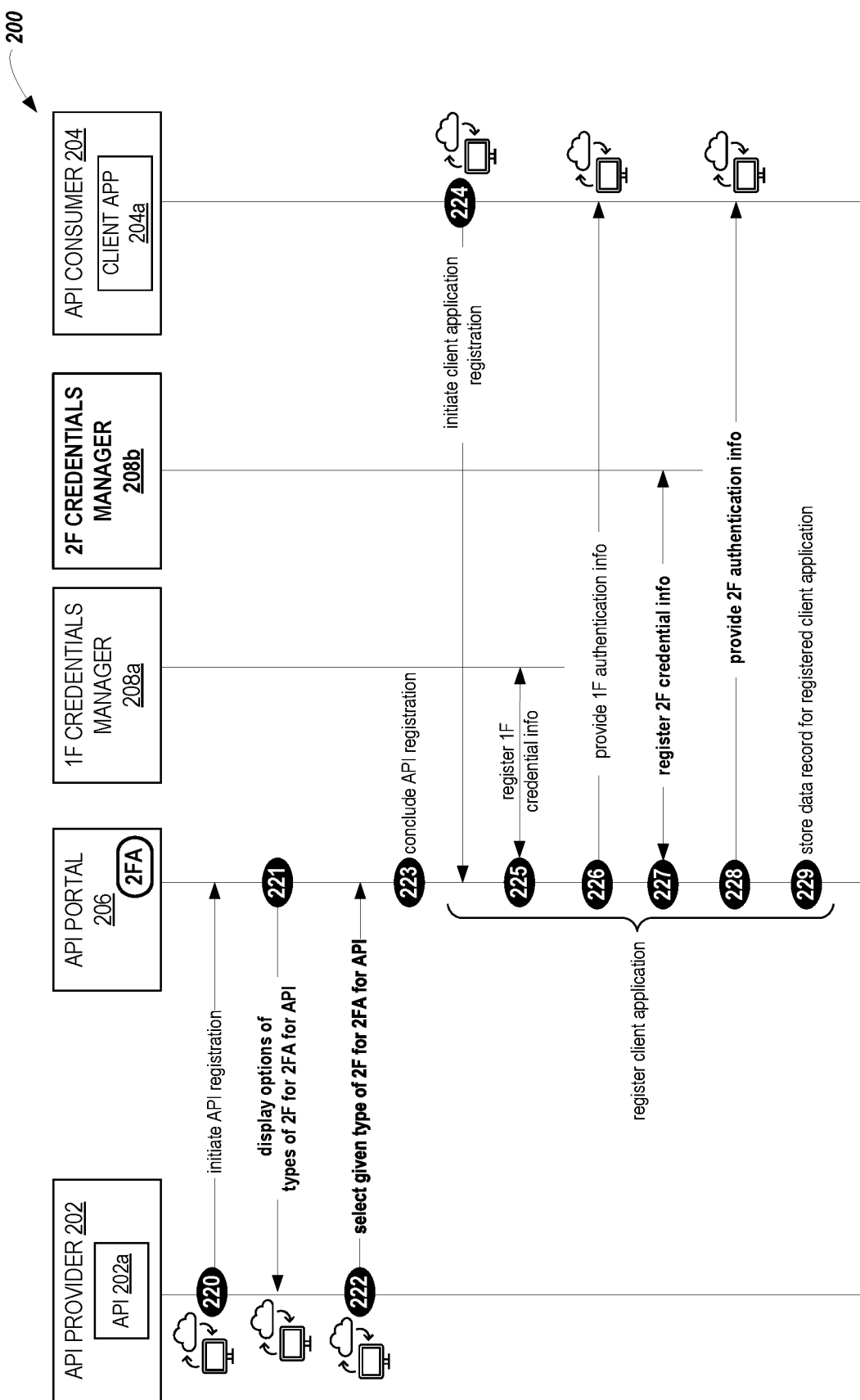
FIG. 2A depicts a flow diagram of an example registration process for one example implementation of the OAuth 2.0 framework that has been extended in accordance with the disclosed two-factor authentication technology.

To illustrate, FIG. 2A depicts one example of a registration process 200 that may be carried out for one implementation of the OAuth 2.0 framework that utilizes the client credentials grant type but has also been extended to provide two-factor authentication in accordance with the present disclosure. Similar to the example registration process 100 of FIG. 1A, the example registration process 200 of FIG. 2A may involve (i) an example API provider 202 that is utilizing an API 202a to expose certain resources hosted by the API provider 202 (e.g., data, back-end services, etc.) to client applications and wishes to protect the API using the OAuth 2.0 framework and (ii) an example API consumer 204 that intends to configure a client application 204a to call the API 202a in order to access certain resources exposed by the API 202a. In this respect, the API provider 202 and API consumer 204 could be different organizations, such as business partners, or could be the same organization (e.g., in a scenario where the client application 204a is a server-based application that is to be hosted by the same organization that is providing the API 202a).

Further, similar to the example registration process 100 of FIG. 1A, the example registration process 200 of FIG. 2A may involve an API portal 206 that is configured to facilitate registration of APIs and client applications that are to utilize the OAuth 2.0 framework in order to govern access to API-exposed resources. As with the API portal 106 of FIG. 1A, this API portal 206 may comprise a computing system that is operated by either the API provider 202 or a third-party organization that offers a platform for interfacing API providers with API consumers (e.g., a third-party API orchestrator), among other possibilities. However, unlike the API portal 106 of FIG. 1A that is only configured to support single-factor authentication, the API portal 206 of FIG. 2A has been extended to support two-factor authentication (or "2FA" for short) in accordance with the present disclosure. In this respect, the API portal 206 of FIG. 2A may be configured to interact with two different client-credentials managers: (i) a first-factor credentials manager 208a and (ii) a second-factor credentials manager 208b, each of which may comprise a functional system that serves to manage a respective type of client-credential information for client applications that register for APIs via the API portal 206. In practice, each of these functional systems could be integrated with the API portal 206 itself or could be implemented on a separate computing system from the API portal 206, which may comprise another computing system operated by the same organization that operates the API portal 206 (e.g., the API provider 102 or a third-party orchestrator) or a computing system operated by a separate organization that provides first-factor and/or second-factor credential management services to organizations that operate API portals, among other possibilities.

As shown in FIG. 2A, the registration process 200 may begin with the API provider 202 interacting with the API portal 206 in order to register the API 202a that exposes certain resources hosted by the API provider 202, which could take the form of a REST API, a SOAP API, a GraphQL API, or an RPC API, among other possibilities. For instance, as shown at step 220, this registration of the API provider's API 202a may be carried out by a representative of the API provider 202 (e.g., a developer, an administrator, etc.), who may use an end-user device to access the API portal 206 over one or more data networks (e.g., via a web application, a mobile application, or the like) and then provide certain information that facilitates registration of the API 202a, examples of which may include identifying information for the API 202a (e.g., a name, a unique API identifier such as a uniform resource identifier (URI), etc.) and certain configuration settings for the API 202a (e.g., permission settings that define a set of possible scopes that can be used by client applications to access resources exposed by the API).

Additionally, as part of the registration process for the API 202a, the API portal 206 that is configured in accordance with the disclosed two-factor authentication technology may (i) cause the API provider 202 to be presented with a set of options for different types of authentication factors that are available for use as a second authentication factor of a two-factor authentication process for the API 202a and then (ii) enable the API provider 202 to select, from the set of options, a particular type of authentication factor to use as the second authentication factor of the two-factor authentication process for the API 202a. For instance, as shown at steps 221-222, the API portal 206 may facilitate this functionality by (i) sending a communication to the end-user device of the API provider's representative over one or more data networks that causes the end-user device to display the set of options for different types of authentication factors that are available for use as a second authentication factor of a two-factor authentication process for the API 202a being registered, and then (ii) receiving, from the end-user device of the API provider's representative over the one or more data networks, an indication of the API provider's selection of the particular type of authentication factor that is to be used as the second authentication factor of the two-factor authentication process for the API 202a. However, the functions of causing the API provider 202 to be presented with the set of options for different types of authentication factors that are available for use as a second authentication factor of a two-factor authentication process for the API 202a and enabling the API provider 202 to select a particular type of authentication factor to use as the second authentication factor of the two-factor authentication process for the API 202a may take other forms as well.

Further, the presented set of options for different types of authentication factors that are available for use as a second authentication factor of a two-factor authentication process for the API 202a may take various forms, and in at least some implementations, the set of options for different types of authentication factors may correspond to different levels of security that could be utilized to govern access to the API 202a. For instance, the API portal 206 may be configured to provide the API provider 202 with two or more options for different types of authentication factors that are available for use as a second authentication factor of a two-factor authentication process for the API 202a, where each respective option corresponds to a different level of security that could be utilized to govern access to the API 202a. As examples, the two or more options for different types of authentication factors that are available for use as a second authentication factor of a two-factor authentication process for the API 202a could include any two or more of (i) a hash of a shared secret that is assigned to a client application, which may correspond to a first level of security, (ii) a JWT that is to be signed by a shared secret assigned to a client application using a symmetric signing algorithm such as a hash-based message authentication code (HMAC) algorithm (e.g., HS256, HS512, etc.) and is validated using that same shared secret, which may correspond to a second level of security that is generally considered to be more secure than the first level of security, and (iii) a JWT that is to be signed by a private key of a public-private key pair assigned to a client application using an asymmetric signing algorithm such as a Rivest-Shamir-Adleman (RSA) algorithm (e.g., RS256) and is validated using the public key of the assigned public-private key pair, which may correspond to a third level of security that is generally considered to be more secure than either the first or second level of security. The two or more options for different types of authentication factors that are available for use as a second authentication factor may include other types of authentication factors and/or take other forms as well—including but not limited to the possibility that the options may include multiple different authentication factors having a comparable level of security. Additionally, in at least some implementations, the presented set of two or more options for different types of authentication factors that are available for use as a second authentication factor may include an option of "no second factor," which may enable the API provider 202 to forgo two-factor authentication for certain APIs.

Along with causing the API provider 202 to be presented with a set of options for different types of authentication factors that are available for use as a second authentication factor of a two-factor authentication process for the API 202a and enabling the API provider 202 to select a particular type of authentication factor to use as the second authentication factor of the two-factor authentication process for the API 202a, the API portal 206 may also enable the API provider 202 to provide other configuration settings for the two-factor authentication process to be utilized for the API 202a as well, examples of which may include a particular signing algorithm to utilize for a certain type of second authentication factor (e.g., HS256 vs. HS512) and/or expiration data for the second authentication factor (e.g., a TTL value), among other possibilities.

Other types of information about the API 202a may be provided by the API provider 202 and/or generated by the API portal 206 during the registration of the API 202a as well.

After the API provider 202 has supplied second factor authentication information and any other configuration settings for the API 202a as described above, then at step 223, the registration process for the new API 202a may conclude with the API portal 206 verifying the API 202a and storing a data record for the newly-registered API 202a, which may include the information about the API 202a that was supplied by the API provider's representative during registration—including the selection of the particular type of authentication factor to use as the second authentication factor of the two-factor authentication process for the API 202a and any corresponding configuration settings specified by the API provider's representative—as well as any other information about the API 202a that is generated by the API portal 206 itself as part of the registration process (e.g., additional configuration settings).

Advantageously, by causing the API provider 202 to be presented with a set of options for different types of authentication factors that are available for use as a second authentication factor of a two-factor authentication process for the API 202a and enabling the API provider 202 to select a particular type of authentication factor to use as the second authentication factor of the two-factor authentication process for the API 202a, the disclosed two-factor authentication technology may provide the API provider 202 with the flexibility to choose which type of two-factor authentication best suits the needs of the API provider 202 and its API consumers on an API-by-API basis based on factors such as business security requirements and implementation goals (e.g., desired complexity level and/or cost for configuring the client-side resources to access the API, desired performance level, etc.). For instance, for an API that exposes less sensitive resources, the API provider 202 has the flexibility to choose a type of second authentication factor that corresponds to a lower level of security but is less complex for the API provider 202 and/or its API consumers to implement (e.g., a hash of a shared secret), which may reduce time and effort required to develop the software for generating and validating the second authentication factor as well as the compute resources required to generate and validate the second authentication factor. On the other hand, for an API that exposes more sensitive resources, the API provider 202 has the flexibility to choose a type of second authentication factor that corresponds to a higher level of security but is also more complex for the API provider 202 and/or its API consumers to implement, which may be justified given the sensitivity of the exposed resources. Other scenarios are possible as well.

After the API 202a has been registered, the API consumer 204 may interact with the API portal 206 in order to register the client application 204a that will be calling the registered API 202a in order to access certain resources that are hosted by the API provider 202 and exposed via the API 202a. For instance, as shown at step 224, this registration of the API consumer's client application 204a may be initiated by a representative of the API consumer 204 (e.g., a developer, an administrator, etc.), who may use an end-user device to access the API portal 206 over one or more data networks (e.g., via a web application, a mobile application, or the like) and then submit a request to register the client application 204a that includes certain information about the client application 204a, examples of which may include identifying information for the client application 204a (e.g., an application name, an application type, an application URI, developer name, etc.), an identification of the API(s) to be accessed by the client application 204a (e.g., API 202a), and certain configuration settings for the client application 204a (e.g., permission settings that define a set of scopes requested by the client application 204a for the identified API(s), which may be selected from the pool of scopes that were previously defined by the API provider 202 during registration of the API 202a, etc.). In practice, the representative of the API consumer 204 may also need to enter pre-registered login credentials for the API portal 206 prior to (or together with) submitting the request to register the client application 204a, which may then be utilized by the API portal 206 to verify that the API consumer 204 has the appropriate permissions to register a client application that will be requesting access to resources exposed by the API 202a. Additionally or alternatively, after receiving the request to register the client application 204a, the API portal 206 may engage in an initial approval process in order to verify that the API consumer 206 has the appropriate permissions to register a client application that will be requesting access to resources exposed by the API 102a, which could optionally involve interaction with the API provider 202.

As shown at step 225, after receiving the request to register the client application 204a that will be calling the API 202a, the API portal 206 may interact with the first-factor credentials manager 208a in order to register first-factor credential information for the client application 204a, which may then be used to carry out a first-factor authentication of the client application 204a when it attempts to access resources via the API 202a. This first-factor credential information may generally comprise the same type of client-credential information that is generated and assigned to the client application 204a as part of the existing OAuth 2.0 framework, which as noted above may take the form of a client identifier (typically referred to as a "client ID" or "API key") and a client secret for the client application 204a (among other possibilities). However, the first-factor credential information that is obtained for the client application 204a could take other forms as well. Further, in practice, this functionality of registering the first-factor credential information for the client application 204a may involve the API portal 206 requesting that the first-factor credential manager 208a provide new first-factor credential information for the client application 204a and the first-factor credential manager 208a responding to that request by (i) generating the new first-factor credential information for the client application 204a, (ii) providing a copy of the first-factor credential information for the client application 204a back to the API portal 206, and also (iii) storing the first-factor credential information for future access by the API consumer 204 and/or the OAuth endpoints discussed below. However, it should be understood that the functionality for registering the first-factor credential information for the client application 204a could take other forms as well.

After registering the first-factor credential information for the client application 204a, the API portal 206 may then cause the registered first-factor credential information for the client application 204a to be presented to the API consumer 204, so that the API consumer 204 can then utilize the first-factor credential information when configuring the client application 204a to call the API 202a. For instance, as shown at step 226, the API portal 206 may send a communication to the end-user device of the API consumer's representative over one or more data networks that enables and causes the end-user device to present the API consumer's representative with the registered first-factor credential information for the client application 204a. In practice, this function of presenting the API consumer's representative with the registered first-factor credential information for the client application 204a may involve either displaying the first-factor credential information itself on the end-user device's screen or presenting the API consumer's representative with a software object (e.g., a link) that can be used to access and view the first-factor credential information, among other possibilities. The API consumer's representative may then record that information for future use by the API consumer 204.

As further shown at step 227, the API portal 206 that is configured in accordance with the present disclosure may additionally interact with the second-factor credentials manager 208b in order to register second-factor credential information for the client application 204a, which may then be used to carry out a second-factor authentication of the client application 204a when it attempts to access resources via the API 202a. In accordance with the present disclosure, the form of the second-factor credential information that is registered for the client application 204a may be dependent on the type of second authentication factor that was selected by the API provider 202 for the API 202a.

For instance, in a first scenario where the type of second authentication factor selected for the API 202a is a hash of a shared secret, then the second-factor credential information that is registered for the client application 204a may take the form of a shared secret. Further, in this first scenario, the functionality for registering the second-factor credential information for the client application 204a may involve the API portal 206 requesting that the second-factor credentials manager 208b provide a new shared secret for the client application 204a that is of a form that can later be hashed by the client application 204a, and the second-factor credentials manager 208b then responding to that request by (i) generating the new shared secret for the client application 204a and (ii) providing a copy of that shared secret for the client application 204a back to the API portal 206. In this respect, the second-factor credentials manager 208b may utilize any of various types of algorithms for generating the shared secret for the client application 204a, including but not limited to an algorithm that utilizes the first-factor credential information for the client application 204a (e.g., the client ID and/or the client secret) as a basis for generating the shared secret for the client application 204a, perhaps along with other inputs such as a seed value and/or a private key for the second-factor credentials manager 208b. Further, in at least some implementations, the second-factor credentials manager 208b may be configured so as not to persistently store the shared secret that it generates for the client application 204a. Instead, the second-factor credentials manager 208b may be configured to discard the shared secret that it generates for the client application 204a after providing the copy of that shared secret back to the API portal 206, and the API portal 206 may likewise be configured to discard the shared secret for the client application 204a after causing it to be presented to the API consumer 204. In this respect, the shared secret that is registered for the client application 204a in this first scenario may be considered to be "vaultless." And in such implementations, the second-factor credentials manager 208b may then be configured to algorithmically re-generate the vaultless shared secret for the client application 204a on an as-needed basis after the registration process concludes, such as when a second-factor authentication needs to be carried out for the client application 204a, which may involve using the same algorithm and the same inputs that were originally used to generate the shared secret in order to re-generate that shared secret.

Alternatively, in a second scenario where the type of second authentication factor selected for the API 202a is a JWT that is to be signed by a shared secret using an HMAC signing algorithm and validated using that same shared secret, then the second-factor credential information that is registered for the client application 204a may take the form of a shared secret that is to be used to sign and validate such an HMAC-based JWT. Further, in this second scenario, the functionality for registering the second-factor credential information for the client application 204a may involve the API portal 206 requesting that the second-factor credentials manager 208b provide a new shared secret for the client application 204a that is of a form that can later be used by the client application 204a to sign such an HMAC-based JWT, and the second-factor credentials manager 208b may respond to that request by (i) generating the new shared secret for the client application 204a and (ii) providing a copy of that shared secret for the client application 204a back to the API portal 206. In this respect, the second-factor credentials manager 208b may utilize any of various types of algorithms for generating the shared secret for the client application 204a, including but not limited to an algorithm that utilizes the first-factor credential information for the client application 204a (e.g., the client ID and/or the client secret) as a basis for generating the shared secret for the client application 204a, perhaps along with other inputs such as a seed value and/or a private key for the second-factor credentials manager 208b. Further, in at least some implementations, the second-factor credentials manager 208b may be configured so as not to persistently store the shared secret that it generates for the client application 204a. Instead, the second-factor credentials manager 208b may be configured to discard the shared secret that it generates for the client application 204a after providing the copy of that shared secret back to the API portal 206, and the API portal 206 may likewise be configured to discard the shared secret for the client application 204a after causing it to be presented to the API consumer 204. In this respect, the shared secret that is registered for the client application 204a in this first scenario may be considered to be vaultless. And in such implementations, the second-factor credentials manager 208b may then be configured to algorithmically re-generate the vaultless shared secret for the client application 204a on an as-needed basis after the registration process concludes, such as when a second-factor authentication needs to be carried out for the client application 204a, which may involve using the same algorithm and the same inputs that were originally used to generate the shared secret in order to re-generate that shared secret.

Alternatively yet, in a second scenario where the type of second-authentication factor selected for the API 202a is a JWT that is to be signed by a private key using an RSA signing algorithm and validated using a corresponding public key from a public-private key pair, then the second-factor credential information that is registered for the client application 204a may take the form of a public key from a public-private key pair for the client application 204a that is to be used to sign and validate such an RSA-based JWT, such as a public-private key pair generated by the API consumer 204 in accordance with the Public Key Infrastructure (PKI). Further, in this third scenario, the functionality for registering the second-factor credential information for the client application 204a may involve the API portal 206 (i) interacting with the API consumer's representative (e.g., via the representative's end-user device) and/or some other source in order to obtain a public key that is included within a previously-generated public-private key pair for the client application 204a (e.g., a public key included within a digital certificate that has been signed by a certificate authority), perhaps along with other associated information such as an identifier of an endpoint for future access or renewal of the public key (e.g., a URI of a JSON Web Key Set (JWKS) endpoint), and then (ii) providing the obtained public-key information for the client application 204a to the second-factor credentials manager 208b, which may in turn store the public-key information for the client application 204a for future access and use by the OAuth endpoints as discussed below. However, in this scenario, the private key for the for the client application 204a will never be received or stored by either the API portal 206 or the second-factor credentials manager 208b.

The second-factor credential information that is registered for the client application 204a—and the functionality for registering second-factor credential information for the client application 204a—could take other forms as well.

After registering the second-factor credential information for the client application 204a, the API portal 206 may then optionally cause the API consumer 204 to be presented with information that is to be utilized by the API consumer 204 when configuring the client application 204a to support the second-factor authentication of the disclosed two-factor authentication process. For instance, as shown at step 228, the API portal 206 may send a communication to the end-user device of the API consumer's representative over one or more data networks that enables and causes the end-user device to present the API consumer's representative with information that is to be utilized by the API consumer 204 when configuring the client application 204a to support the second-factor authentication of the disclosed two-factor authentication process. In practice, this function of presenting the API consumer's representative with this information may involve either displaying the information on the end-user device's screen or presenting the API consumer's representative with a software object (e.g., a link) that can be used to access, view, and/or download the information, among other possibilities. (While the function of providing the information for the second-factor authentication is shown separately from the function of providing the information for the first-factor authentication, it should be understood that in some implementations, these functions may be combined and carried out together).

Further, the second-factor authentication information that is presented to the API consumer 204 may take various forms, examples of which may include information specifying the particular type of second authentication factor that needs to be used by the client application 204a when calling the API 202a, and depending on the type of second authentication factor, perhaps also the second-factor credential information that is registered for the client application 204a. For instance, if the second-factor credential information that is registered for the client application 204a takes the form of a second-factor shared secret that is generated by the second-factor credential manager 208b (e.g., a shared secret that is to be hashed by the client application 204a or a shared secret that is to be used to sign and validate an HMAC-based JWT), the API portal 206 may then cause the registered second-factor shared secret for the client application 204a to be presented to the API consumer 204, so that the API consumer 204 can then utilize the second-factor shared secret when configuring the client application 204a to call the API 202a. On the other hand, if the second-factor credential information that is registered for the client application 204a takes the form of a public-private key for the client application 204a, then no second-factor credential information for the client application 204a may be presented to the API consumer 204. The second-factor authentication information that is presented to the API consumer 204 may take other forms as well.

As shown at step 229, the registration process for the client application 204a may also involve the API portal 206 storing a data record for the newly-registered client application 204a, which may include the information about the client application 204a that was supplied by the API consumer's representative during registration and perhaps also other information about the client application 204a that was generated by the API portal 206 as part of the registration process, such as additional identifiers, configuration settings, and/or a copy of at least a portion of the client-credential information for the client application 204a (e.g., the first-factor credential information and perhaps also public-key information for the client application 204a). However, in line with the vaultless second-factor credential implementations discussed above, the data record stored at the API portal 206 will preferably not include any secret second-factor credential information for the client application 204a, such as the second-factor shared secret or private key for the client application 204a.

Advantageously, by not persisting the second-factor shared secret or private key for the client application 204a at either the API portal 206 or the second-factor credential manager 208b, the disclosed two-factor authentication technology may add an additional layer of protection for the API provider's resources. For instance, in the event that the API portal 206 or the second-factor credential manager 208b is breached, the breaching party will still be unable to gain access to the second-factor shared secrets and/or private keys for the client applications that are authorized to call the API 202a, and thus will be unable to provide the required second authentication factor when calling the API 202a, thereby preventing the breaching party from accessing the API provider's resources that are exposed by the API 202a.

While the preferred implementations of the disclosed technology involve the use of a vaultless second-factor shared secret or private key that is not persisted at either the API portal 206 or the second-factor credential manager 208b in order to increase security, in other implementations, the second-factor shared secret or private key for the client application 204a could be persisted at the API portal 206 and/or the second-factor credential manager 208b.

The process for registering APIs and client applications in an implementation of the OAuth 2.0 framework that has been extended in accordance with the disclosed two-factor authentication technology may take various other forms as well.

Once the registration process 200 for the API 202a and the client application 204a has been completed, the API consumer 204 can then configure the client application 204a to begin requesting access to resources exposed by the API 202a in accordance with the disclosed two-factor authentication extension of the OAuth 2.0 framework. In this respect, the disclosed two-factor authentication extension of the OAuth 2.0 framework may be implemented in at least two different ways. For instance, according to a first embodiment of the disclosed two-factor authentication technology, an OAuth resource endpoint may be extended to perform a second-factor authentication of the client application 204a prior to authorizing each API call made by the client application 204a, in which case the client application 204a may be configured to include a second authentication factor in each API request it makes to the OAuth resource endpoint. Alternatively, according to a second embodiment of the disclosed two-factor authentication technology, an OAuth token endpoint may be extended to perform a second-factor authentication of the client application 204a prior to issuing an access token to the client application 204a, in which case the client application 204a may be configured to include a second authentication factor in each token request it makes to the OAuth token endpoint. Each of these implementations will now be described in further detail.

Figure 2B:
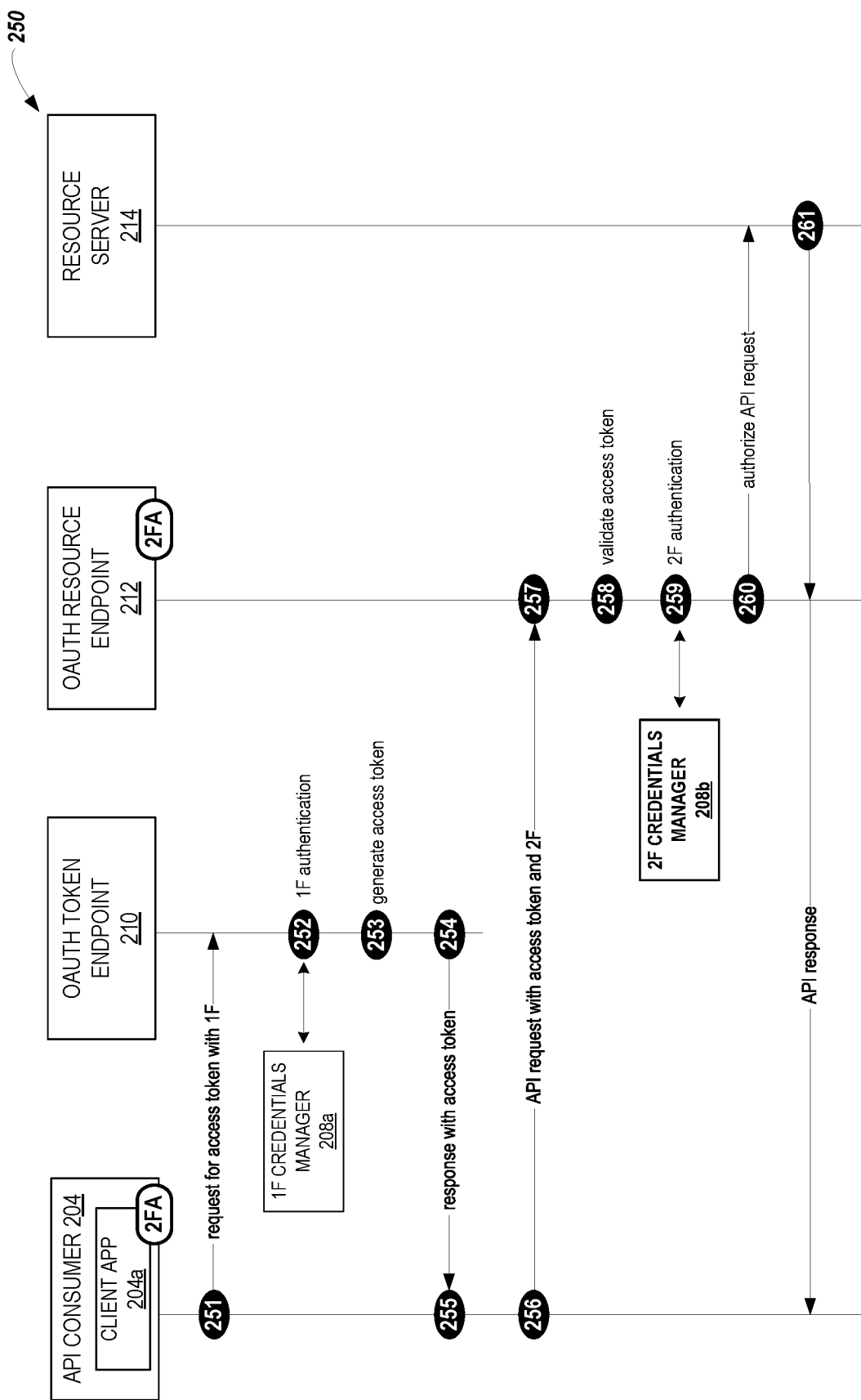
FIG. 2B depicts a flow diagram of an example process for authenticating and authorizing a client application to access one or more resources exposed by an API in accordance with a first embodiment of the disclosed two-factor authentication technology.

Starting with FIG. 2B, a flow diagram is shown that illustrates one example of a process 250 for authenticating and authorizing the client application 204a to access one or more resources exposed by the API 202a of the API provider 202 in accordance with the first embodiment of the disclosed two-factor authentication technology, which as noted above comprises an implementation where the OAuth resource endpoint is extended to perform a second-factor authentication of the client application 204a prior to authorizing the client application's API call.

As with the example process 130 of FIG. 1B, the example process 250 of FIG. 2B is shown to involve (i) the registered client application 204a, which may be running on a computing system of the API consumer 204, (ii) an OAuth token endpoint 210, which may be running on a computing system that is configured to serve as an OAuth "authorization server," (iii) an OAuth resource endpoint 212, which may be running on a computing system that is configured to serve as a proxy (or entry point) for the registered API, and (iv) the computing system of the API provider 202 that is hosting the resources exposed by the registered API, which is shown in FIG. 2B as a resource server 214. However, as further shown in FIG. 2B, the client application 204a and the OAuth resource endpoint 212 have now been extended to carry out additional functionality in accordance with the first embodiment of the disclosed technology for extending the OAuth 2.0 framework to provide two-factor authentication (or "2FA" for short).

In practice, these computing systems may interact with one another via one or more data networks, examples of which may include PANs, LANs, WANs such as the Internet or cellular networks, and/or cloud networks, among other possibilities. Further, in practice, the computing systems running the OAuth token endpoint 210 and the OAuth resource endpoint 212 could be operated either by the API provider 202 or by a third-party organization that serves to perform OAuth endpoint operations on behalf of the API provider 202, among other possibilities.

The example process 250 may begin at step 251 with the client application 204a (i) generating a request for an access token, where the request includes a first authentication factor that encodes the first-factor credential information for the client application 204a (e.g., the client ID and client secret) and then (ii) causing that request to be sent from the computing system of the API consumer 204 to the OAuth token endpoint 210 running on the OAuth authorization server. In this respect, the manner in which the client application 204a encodes its first-factor credential information into the first authentication factor that is included in the request may take various forms. For instance, in one implementation where the first-factor credential information takes the form of a client ID and client secret, the client application 204a may include the client ID as well as the client secret itself within the request for the access token, in which case the client ID and the client secret may serve as the first authentication factor that encodes the first-factor credential information. In another implementation where the first-factor credential information takes the form of a client ID and client secret, the client application may use the client secret to generate a JWT and then include the JWT (along with the client ID) in the request for the access token, in which case the client ID and the JWT may serve as the first authentication factor that encodes the first-factor credential information. The client application 204a may utilize other methods for encoding its first-factor credential information into the request for the access token as well.

As shown in FIG. 2B, the OAuth token endpoint 210 may receive the request for the access token, and then at step 252, may perform a first-factor authentication of the client application 204a by validating the first authentication factor that is included within the request (which as noted above encodes the first-factor credential information for the client application 204a). This function may take various forms, which may depend on the form of the first authentication factor. For instance, in an implementation where the first authentication factor comprises the client secret itself, the OAuth token endpoint's first-factor authentication of the client application 204a may involve interacting with the first-factor credentials manager 208a in order to validate the received client secret (e.g., by comparing the received client secret against the client secret that was generated and stored by the first-factor credentials manager 208a during the registration of the client application 204a). Alternatively, in an implementation where the first authentication factor comprises a JWT rather than the client secret itself, the OAuth token endpoint's first-factor authentication of the client application 204a may involve validating the received JWT (e.g., by validating that the JWT was signed using the client secret that was generated and stored by the first-factor credentials manager 208a during the registration of the client application 204a). The OAuth token endpoint's first-factor authentication of the client application 204a may take other forms as well.

As part of the first-factor authentication, the OAuth token endpoint 210 may also interact with the API portal 206 in order to (i) confirm that the client application 204a has authorization to access resources exposed by the API 202a and (ii) obtain the client application's scope(s) for the API 202a.

If the client application 204a is successfully authenticated based on the first authentication factor, then at step 253, the OAuth token endpoint 210 may generate an access token that represents an authorization for the client application 204a to access certain resources that are exposed by the API 202a. At step 254, the OAuth token endpoint 210 may cause the generated access token to be sent from the OAuth token endpoint 210 back to the client application 204a running on the API consumer's computing system. In practice, this generated access token may take various forms, examples of which may include a JWT type of access token (which may be encoded with a given set of token information) or an opaque type of access token (which may be cross-referenced with a given set of token information), among other possibilities.

As shown at step 255, the client application 204a may receive the access token that was generated by the OAuth token endpoint 210. In turn, at step 256, the client application 204a that is extended in accordance with the first embodiment of the disclosed two-factor authentication technology may (i) generate an API request to access one or more resources that are hosted by the API provider's resource server 214 and exposed by the API 202a, where the request includes the access token provided by the OAuth token endpoint 210 and a second authentication factor that encodes the second-factor credential information for the client application 204a, and then (ii) cause that API request to be sent from the API consumer's computing system to the OAuth resource endpoint 212 running on the computing system serving as the proxy for the API 202a.

In accordance with the present disclosure, the manner in which the client application 204a encodes its second-factor credential information into the second authentication factor may be dependent on the type of second authentication factor that has been selected by the API provider 202 for the API 202a. For instance, if the type of second authentication factor selected for the API 202a is a hash of a shared secret—in which case the client application's second-factor credential information may comprise a shared secret that was assigned to the client application 204a during registration—then the client application 204a may apply a hashing algorithm to the client application's shared secret in order to encode the shared secret into a hash, which may serve as the second authentication factor that encodes the second-factor credential information. Alternatively, if the type of second authentication factor that is selected for the API 202a is a JWT that is to be signed by a shared secret using an HMAC signing algorithm—in which case the client application's second-factor credential information may comprise a shared secret that was assigned to the client application 204a during registration—then the client application 204a may generate a JWT that is signed by the client application's shared secret using an HMAC signing algorithm, which may serve as the second authentication factor that encodes the second-factor credential information. Alternatively yet, if the type of second authentication factor that is selected for the API 202a is a JWT that is to be signed by a private key using an RSA signing algorithm—in which case the client application's second-factor credential information may comprise a public-private key pair for the client application 204a—then the client application 204a may generate a JWT that is signed by the client application's private key using an RSA signing algorithm, which may serve as the second authentication factor that encodes the second-factor credential information. The client application 204a may utilize other methods for encoding its second-factor credential information into the API request as well.

As shown at step 257, the OAuth resource endpoint 212 may receive the API request from the client application 204a, which as noted above includes the access token and the second authentication factor. In turn, at step 258, the OAuth resource endpoint 212 may validate the access token. In line with the discussion above, this function of validating the access token may take various forms, which may depend in part on the form of the access token (e.g., whether the access token comprises a JWT type of token, an opaque type of token, or some other type of token). For instance, in an implementation where the access token comprises a JWT type of token that was signed by the OAuth token endpoint 210, the function of validating the access token may involve verifying the signature of the JWT and perhaps also verifying other claims included within the JWT token (e.g., scopes, expiration time, audience, issuance time, etc.). Alternatively, in an implementation where the access token comprises an opaque type of token, the function of validating the access token may involve interacting with an introspection endpoint on the OAuth authorization server to obtain token information corresponding to the opaque token and then verifying certain aspects of that information (e.g., active state, scopes, expiration time, audience, issuance time, etc.). The function of validating the access token may take other forms as well.

Further, as shown at step 259, the OAuth resource endpoint 212 that is extended in accordance with the first embodiment of the disclosed two-factor authentication technology may additionally perform a second-factor authentication of the client application 204a by validating the second authentication factor included in the API request (which as noted above encodes the second-factor credential information for the client application 204*a*). This function of validating the second authentication factor may take various forms, which may depend on the type of second authentication factor being used for the API 202*a*.

For instance, in a first scenario where the second authentication factor is a hash of a shared secret assigned to the client application 204*a*, the OAuth resource endpoint 212 may begin by interacting with the second-factor credentials manager 208*b* in order to obtain the shared secret for the client application 204*a*. This function may take various forms depending on whether the client application's shared secret is vaultless or is persisted at the second-factor credentials manager 208*b*. For instance, if the client application's shared secret is vaultless, the OAuth resource endpoint 212 may request that the second-factor credentials manager 208*b* algorithmically re-generate the shared secret for the client application 204*a*, and the second-factor credentials manager 208*b* may in turn re-generate the shared secret for the client application 204*a* utilizing the same algorithm and the same inputs that were previously used to generate the shared secret for the client application 204*a* (e.g., the first-factor credentials information for the client application 204*a*, a seed value, a private key for the second-factor credentials manager 208*b*, etc.) and then return the regenerated shared secret to the OAuth resource endpoint 212. On the other hand, if the client application's shared secret is persisted at the second-factor credentials manager 208*b*, the OAuth resource endpoint 212 may simply retrieve that shared secret from the second-factor credentials manager 208*b*. The OAuth resource endpoint 212 may obtain the shared secret for the client application 204*a* in other manners as well.

After obtaining the shared secret for the client application 204*a*, the OAuth resource endpoint 212 may next generate a hash of the obtained shared secret for the client application 204*a* by using the same hashing algorithm that was used by the client application 204*a*. To facilitate this functionality, the header of the received hash may include an identification of the hashing algorithm used by the client application 204*a* to generate the hash, and/or the OAuth resource endpoint 212 may have previously obtained an identification of the hashing algorithm from the second-factor credentials manager 208*b* or the API portal 206, among other possibilities.

Lastly, after generating the hash of the obtained shared secret for the client application 204*a*, the OAuth resource endpoint 212 may compare the generated hash of the obtained shared secret for the client application 204*a* to the received hash of the shared secret that was sent by the client application 204*a* in order to authenticate the client application 204*a*. In this respect, if the generated and received hashes match one another, the second-factor authentication of the client application 204*a* will succeed, whereas if the generated and received hashes do not match one another, the second-factor authentication of the client application 204*a* will fail.

Alternatively, in a second scenario where the second authentication factor is an HMAC-based JWT that purports to have been signed by a shared secret assigned to the client application 204*a*, the OAuth resource endpoint 212 may begin by interacting with the second-factor credentials manager 208*b* in order to obtain the shared secret for the client application 204*a*. In line with the discussion above, this function may take various forms depending on whether the client application's shared secret is vaultless or is persisted at the second-factor credentials manager 208*b*. For instance, if the client application's shared secret is vaultless, the OAuth resource endpoint 212 may request that the second-factor credentials manager 208*b* algorithmically re-generate the shared secret for the client application 204*a*, and the second-factor credentials manager 208*b* may in turn re-generate the shared secret for the client application 204*a* utilizing the same algorithm and the same inputs that were previously used to generate the shared secret for the client application 204*a* (e.g., the first-factor credentials information for the client application 204*a*, a seed value, a private key for the second-factor credentials manager 208*b*, etc.) and then return the regenerated shared secret to the OAuth resource endpoint 212. On the other hand, if the client application's shared secret is persisted at the second-factor credentials manager 208*b*, the OAuth resource endpoint 212 may simply retrieve that shared secret from the second-factor credentials manager 208*b*. The OAuth resource endpoint 212 may obtain the shared secret for the client application 204*a* in other manners as well.

After obtaining the shared secret for the client application 204*a*, the OAuth resource endpoint 212 may next validate the HMAC-based JWT included in the API request, which may involve validating that the received HMAC-based JWT was signed using the shared secret assigned to the client application 204*a* and perhaps also validating certain other information included within the header and/or payload segments of the received HMAC-based JWT, such as expiration time, scopes, audience, and/or issuance time, among other possibilities. For instance, the OAuth resource endpoint 212 may validate that the received HMAC-based JWT was signed using the shared secret assigned to the client application 204*a* by (i) using the header and payload segments of the received HMAC-based JWT and the obtained shared secret for the client application 204*a* to generate another version of the HMAC-based JWT's signature, and then (ii) comparing the signature of the received HMAC-based JWT to the generated signature to determine whether they match. In this respect, if the signatures match one another and the other information included within the header and/or payload segments of the received HMAC-based JWT is also valid (e.g., expiration time, scopes, audience, issuance time, etc.), the second-factor authentication of the client application 204*a* will succeed, whereas if the signatures do not match one another or certain of the other information included within the header and/or payload segments of the received HMAC-based JWT cannot be validated, the second-factor authentication of the client application 204*a* will fail.

Alternatively yet, in a third scenario where the second authentication factor is an RSA-based JWT that purports to have been signed by a private key for the client application 204*a*, the OAuth resource endpoint 212 may begin by interacting with the second-factor credentials manager 208*b* (or the API portal 206) in order to retrieve the corresponding public key for the client application 204*a*, which will typically be persisted at the second-factor credentials manager 208*b* (and/or the API portal 206). However, the OAuth resource endpoint 212 may obtain the public key for the client application 204*a* in other manners as well, including but not limited to the possibility that the public key could be retrieved from some other entity that is tasked with storing public keys for client applications such as a JWKS endpoint or the like. Further, along with obtaining the public key for the client application 204*a*, the OAuth resource endpoint 212 may also confirm that the public key for the client application 204*a* is still valid, such as by confirming that the public key does not appear on a revocation list maintained by a certificate authority and/or confirming that the public key has not expired, among other possibilities. In this respect, if the OAuth resource endpoint 212 is unable to confirm that the obtained public key for the client application 204a is valid, the OAuth resource endpoint 212 may also function to interact with a JWKS endpoint (or the like) in order to renew the public key for the client application 204a.

After obtaining the public key for the client application 204a (and confirming it is valid), the OAuth resource endpoint 212 may next validate the RSA-based JWT included in the API request, which may involve validating that the received RSA-based JWT was signed using the private key assigned to the client application 204a and perhaps also validating certain other information included within the header and payload segments of the received RSA-based JWT, such as expiration time, scopes, audience, and/or issuance time, among other possibilities. For instance, the OAuth resource endpoint 212 may validate that the received RSA-based JWT was signed using the private key assigned to the client application 204a by (i) using the obtained public key to decrypt the signature of the received RSA-based JWT, which produces the signing hash for the received RSA-based JWT, (ii) using the header and payload segments of the received RSA-based JWT to generate another version of the signing hash, and then (iii) comparing the decrypted signing hash of the received RSA-based JWT to the generated signing hash to determine whether they match. In this respect, if the decrypted and generated signing hashes match one another and the other information included within the header and/or payload segments of the received RSA-based JWT is also valid (e.g., expiration time, scopes, audience, issuance time, etc.), the second-factor authentication of the client application 204a will succeed, whereas if the signing hashes do not match one another or certain of the other information included within the header and/or payload segments of the received RSA-based JWT cannot be validated, the second-factor authentication of the client application 204a will fail. Notably, this type of second authentication factor provides certain security benefits relative to the other types of second authentication factors, including data integrity and non-repudiation.

Additionally, as part of the second-factor authentication, the OAuth resource endpoint 212 may also confirm with the API portal 206 that the client application 204a has approval to call the API 202a, which may protect against a scenario where the approval status of the client application 204a has been revoked between the time that the access token was issued to the client application 204a (e.g., step 254 shown in FIG. 2B) and the time that the client application 204a calls the API 202a (e.g., step 256 shown in FIG. 2B).

The OAuth resource endpoint's second-factor authentication of the client application 204a factor may take other forms as well.

If the access token and the second authentication factor are both successfully validated by the OAuth resource endpoint 212, then at step 260, the OAuth resource endpoint 212 may authorize the API request and relay the API request to the resource server 214, and at step 261, the resource server 214 may send an API response back to the client application 204a (via the OAuth resource endpoint 212) that provides the client application 204a with the requested access to the one or more resources. On the other hand, if either the access token or the second authentication factor cannot be successfully validated by the OAuth resource endpoint 212, the OAuth resource endpoint 212 may deny the API request and send an API response back to the client application 204a indicating that the API request has been denied.

The process 250 for authenticating and authorizing the client application 204a to access one or more resources exposed by the API 202a of the API provider 202 in accordance with the first embodiment of the disclosed two-factor authentication technology could take various other forms as well. For instance, while the first embodiment of the disclosed two-factor authentication technology is described above in the context of an example implementation of the OAuth 2.0 framework that utilizes a client credentials grant type, this first embodiment of the disclosed two-factor authentication technology may be applicable to any implementation of the OAuth 2.0 framework involving an OAuth resource endpoint that governs access to API-exposed resources based on validation of an access token for a client application that was previously issued by an OAuth token endpoint, including but not limited to implementations of the OAuth 2.0 framework that utilize an authorization code or resource owner password credentials grant type. In such implementations, the OAuth resource endpoint may be extended in accordance with the disclosed technology in order to authorize API requests from a client application based not only on the validation of an access token for the client application, but also on validation of a given type of second authentication factor for the client application that is included in the client application's API request.

Figure 2C:
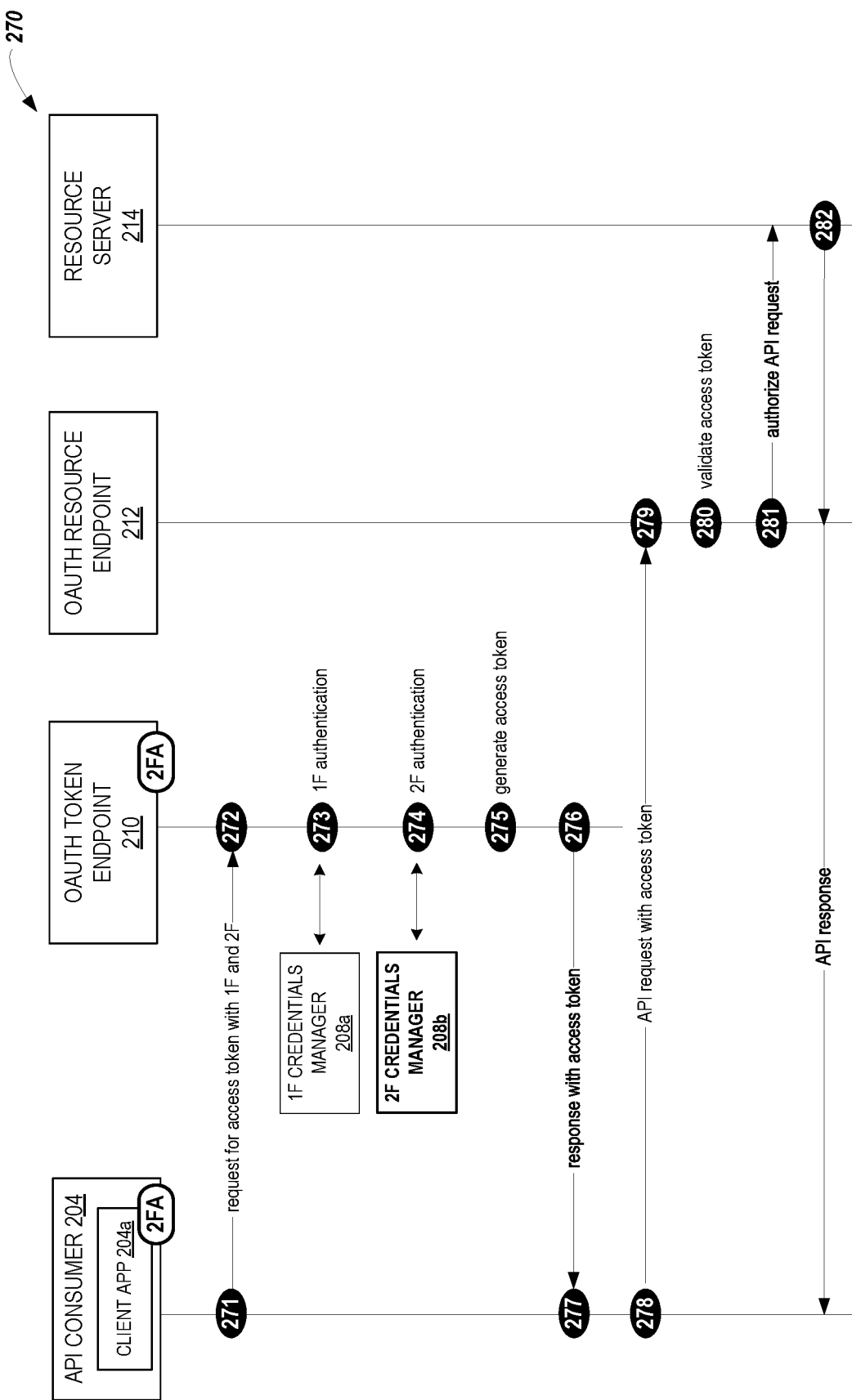
FIG. 2C depicts a flow diagram of an example process for authenticating and authorizing a client application to access one or more resources exposed by an API in accordance with a second embodiment of the disclosed two-factor authentication technology.

Turning now to FIG. 2C, a flow diagram is shown that illustrates one example of a process 270 for authenticating and authorizing the client application 204a to access one or more resources exposed by the API 202a of the API provider 202 in accordance with the second embodiment of the disclosed two-factor authentication technology wherein the OAuth token endpoint 210 is extended to perform a second-factor authentication of the client application 204a prior to issuing an access token to the client application 204a.

As with the example process 130 of FIG. 1B, the example process 270 of FIG. 2C is similarly shown to involve (i) the registered client application 204a, which may be running on a computing system of the API consumer 204, (ii) the OAuth token endpoint 210, which may be running on a computing system that is configured to serve as an OAuth "authorization server," (iii) the OAuth resource endpoint 212, which may be running on a computing system that is configured to serve as a proxy (or entry point) for the registered API, and (iv) the computing system of the API provider 202 that is hosting the resources exposed by the registered API, which is shown in FIG. 2C as a resource server 214. However, as further shown in FIG. 2C, the client application 204a and the OAuth token endpoint 210 have now been extended to carry out additional functionality in accordance with the second embodiment of the disclosed technology for extending the OAuth 2.0 framework to provide two-factor authentication (or "2FA" for short).

In practice, these computing systems may interact with one another via one or more data networks, examples of which may include PANs, LANs, WANs such as the Internet or cellular networks, and/or cloud networks, among other possibilities. Further, in practice, the computing systems running the OAuth token endpoint 210 and the OAuth resource endpoint 212 could be operated either by the API provider 202 or by a third-party organization that serves to perform OAuth token-endpoint operations on behalf of the API provider 202, among other possibilities.

The example process 270 may begin at step 271 with the client application 204a generating a request for an access token and then causing that request to be sent from the computing system of the API consumer 204 to the OAuth token endpoint 210 running on the OAuth authorization server. However, whereas the request for the access token that is generated and sent by the client application 204a in the first embodiment includes only a first authentication factor that encodes the first-factor credential information for the client application 204a, the request for the access token that is generated and sent by the client application 204a at step 271 in this second embodiment may include both (i) a first authentication factor that encodes the first-factor credential information for the client application 204a and (ii) a second authentication factor that encodes the second-factor credential information for the client application 204a. In this respect, the manner in which the client application 204a encodes its first-factor credential information into the first authentication factor and its second-factor credential information into the second authentication factor may take various forms, which may be similar to the forms described above with respect to the first embodiment.

Starting with the first authentication factor, in an implementation where the first-factor credential information takes the form of a client ID and client secret, the client application 204a may include the client ID and the client secret themselves within the request for the access token, in which case the client ID and the client secret may serve as the first authentication factor that encodes the first-factor credential information. Or in another implementation where the first-factor credential information takes the form of a client ID and client secret, the client application may use the client secret to generate a JWT and then include the JWT (along with the client ID) in the request for the access token, in which case the client ID and the JWT may serve as the first authentication factor that encodes the first-factor credential information. The client application 104a may utilize other methods for encoding its first-factor credential information into the request for the access token as well.

Turning to the second authentication factor, the manner in which the client application 204a encodes its second-factor credential information into the second authentication factor that is included in the request for the access token may be dependent on the type of second authentication factor that has been selected by the API provider 202 for the API 202a. For instance, if the type of second authentication factor selected for the API 202a is a hash of a shared secret—in which case the client application's second-factor credential information may comprise a shared secret that was assigned to the client application 204a during registration—then the client application 204a may apply a hashing algorithm to the client application's shared secret in order to encode the shared secret into a hash, which may serve as the second authentication factor that encodes the second-factor credential information. Alternatively, if the type of second authentication factor that is selected for the API 202a is a JWT that is to be signed by a shared secret using an HMAC signing algorithm—in which case the client application's second-factor credential information may comprise a shared secret that was assigned to the client application 204a during registration—then the client application 204a may generate a JWT that is signed by the client application's shared secret using an HMAC signing algorithm, which may serve as the second authentication factor that encodes the second-factor credential information. Alternatively yet, if the type of second authentication factor that is selected for the API 202a is a JWT that is to be signed by a private key using an RSA signing algorithm—in which case the client application's second-factor credential information may comprise a public-private key pair for the client application 204a—then the client application 204a may generate a JWT that is signed by the client application's private key using an RSA signing algorithm, which may serve as the second authentication factor that encodes the second-factor credential information. The client application 204a may utilize other methods for encoding its second-factor credential information into the request for the access token as well.

As shown at step 272, the OAuth token endpoint 210 may receive the request for the access token that includes the first authentication factor and the second authentication factor. In turn, the OAuth token endpoint 210 that is configured in accordance with the second embodiment of the disclosed two-factor authentication technology may perform both a first-factor authentication and a sector-factor authentication of the client application 204a.

For instance, at shown at step 273, the OAuth token endpoint 210 may perform the first-factor authentication of the client application 204a by validating the first authentication factor that is included within the request for the access token (which as noted above encodes the first-factor credential information for the client application 204a). This function may take various forms, which may depend on the form of the first authentication factor. For instance, in an implementation where the first authentication factor comprises the client secret itself, the OAuth token endpoint's first-factor authentication of the client application 204a may involve interacting with the first-factor credentials manager 208a in order to validate the received client secret (e.g., by comparing the received client secret against the client secret that was generated and stored by the first-factor credentials manager 208a during the registration of the client application 204a). Alternatively, in an implementation where the first authentication factor comprises a JWT rather than the client secret itself, the OAuth token endpoint's first-factor authentication of the client application 204a may involve validating the received JWT (e.g., by validating that the JTW was signed by the client secret that was generated and stored by the first-factor credentials manager 208a during the registration of the client application 204a). The OAuth token endpoint's first-factor authentication of the client application 204a may take other forms as well.

Further, as shown at step 274, the OAuth token endpoint 210 that is extended in accordance with the second embodiment of the disclosed two-factor authentication technology may perform a second-factor authentication of the client application 204a by validating the second authentication factor included in the request for the access token (which as noted above encodes the second-factor credential information for the client application 204a). This function of validating the second authentication factor may take various forms, which may depend on the type of second authentication factor being used for the API 202a.

For instance, in a first scenario where the second authentication factor is a hash of a shared secret assigned to the client application 204a, the OAuth token endpoint 210 may begin by interacting with the second-factor credentials manager 208b in order to obtain the shared secret for the client application 204a. This function may take various forms depending on whether the client application's shared secret is vaultless or is persisted at the second-factor credentials manager 208b. For instance, if the client application's shared secret is vaultless, the OAuth token endpoint 210 may request that the second-factor credentials manager 208b algorithmically re-generate the shared secret for the client application 204a, and the second-factor credentials manager 208b may in turn re-generate the shared secret for the client application 204a utilizing the same algorithm and the same information that was previously used to generate the shared secret for the client application 204a (e.g., the first-factor credentials information for the client application 204a, a seed value, etc.) and then return the regenerated shared secret to the OAuth token endpoint 210. On the other hand, if the client application's shared secret is persisted at the second-factor credentials manager 208b, the OAuth token endpoint 210 may simply retrieve that shared secret from the second-factor credentials manager 208b. The OAuth token endpoint 210 may obtain the shared secret for the client application 204a in other manners as well.

After obtaining the shared secret for the client application 204a, the OAuth token endpoint 210 may next generate a hash of the obtained shared secret for the client application 204a by using the same hashing algorithm that was used by the client application 204a. To facilitate this functionality, the header of the received hash may include an identification of the hashing algorithm used by the client application 204a to generate the hash, and/or the OAuth token endpoint 210 may have previously obtained an identification of the hashing algorithm from the second-factor credentials manager 208b or the API portal 206, among other possibilities.

Lastly, after generating the hash of the obtained shared secret for the client application 204a, the OAuth token endpoint 210 may compare the generated hash of the obtained shared secret for the client application 204a to the received hash of the shared secret that was sent by the client application 204a in order to authenticate the client application 204a. In this respect, if the generated and received hashes match one another, the second-factor authentication of the client application 204a will succeed, whereas if the generated and received hashes do not match one another, the second-factor authentication of the client application 204a will fail.

Alternatively, in a second scenario where the second authentication factor is an HMAC-based JWT that purports to have been signed by a shared secret assigned to the client application 204a, the OAuth token endpoint 210 may begin by interacting with the second-factor credentials manager 208b in order to obtain the shared secret for the client application 204a. In line with the discussion above, this function may take various forms depending on whether the client application's shared secret is vaultless or is persisted at the second-factor credentials manager 208b. For instance, if the client application's shared secret is vaultless, the OAuth token endpoint 210 may request that the second-factor credentials manager 208b algorithmically re-generate the shared secret for the client application 204a, and the second-factor credentials manager 208b may in turn re-generate the shared secret for the client application 204a utilizing the same algorithm and the same information that was previously used to generate the shared secret for the client application 204a (e.g., the first-factor credentials information for the client application 204a, a seed value, etc.) and then return the regenerated shared secret to the OAuth token endpoint 210. On the other hand, if the client application's shared secret is persisted at the second-factor credentials manager 208b, the OAuth token endpoint 210 may simply retrieve that shared secret from the second-factor credentials manager 208b. The OAuth token endpoint 210 may obtain the shared secret for the client application 204a in other manners as well.

After obtaining the shared secret for the client application 204a, the OAuth token endpoint 210 may next validate the HMAC-based JWT included in the API request, which may involve validating that the received HMAC-based JWT was signed using the shared secret assigned to the client application 204a and perhaps also validating certain other information included within the header and payload segments of the received HMAC-based JWT, such as expiration time, scopes, audience, and/or issuance time, among other possibilities. For instance, the OAuth token endpoint 210 may validate that the received HMAC-based JWT was signed using the shared secret assigned to the client application 204a by (i) using the header and payload segments of the received HMAC-based JWT and the obtained shared secret for the client application 204a to generate another version of the HMAC-based JWT's signature, and then (ii) comparing the signature of the received HMAC-based JWT to the generated signature to determine whether they match. In this respect, if the signatures match one another and the other information included within the header and/or payload segments of the received HMAC-based JWT is also valid (e.g., expiration time, scopes, audience, issuance time, etc.), the second-factor authentication of the client application 204a will succeed, whereas if the signatures do not match one another or certain of the other information included within the header and/or payload segments of the received HMAC-based JWT cannot be validated, the second-factor authentication of the client application 204a will fail.

Alternatively yet, in a third scenario where the second authentication factor is an RSA-based JWT that purports to have been signed by a private key for the client application 204a, the OAuth token endpoint 210 may begin by interacting with the second-factor credentials manager 208b (or the API portal 206) in order to retrieve the corresponding public key for the client application 204a, which will typically be persisted at the second-factor credentials manager 208b (and/or the API portal 206). However, the OAuth token endpoint 210 may obtain the public key for the client application 204a in other manners as well, including but not limited to the possibility that the public key could be retrieved from some other entity that is tasked with storing public keys for client applications such as a JWKS endpoint or the like. Further, along with obtaining the public key for the client application 204a, the OAuth token endpoint 210 may also confirm that the public key for the client application 204a is still valid, such as by confirming that the public key does not appear on a revocation list maintained by a certificate authority and/or confirming that the public key has not expired, among other possibilities. In this respect, if the OAuth token endpoint 210 is unable to confirm that the obtained public key for the client application 204a is valid, the OAuth token endpoint 210 may also function to interact with a JWKS endpoint (or the like) in order to renew the public key for the client application 204a.

After obtaining the public key for the client application 204a (and confirming it is valid), the OAuth token endpoint 210 may next validate the RSA-based JWT included in the API request, which may involve validating that the received RSA-based JWT was signed using the private key assigned to the client application 204a and perhaps also validating certain other information included within the header and payload segments of the received RSA-based JWT, such as expiration time, scopes, audience, and/or issuance time, among other possibilities. For instance, the OAuth token endpoint 210 may validate that the received RSA-based JWT was signed using the private key assigned to the client application 204a by (i) using the obtained public key to decrypt the signature of the received RSA-based JWT, which produces the signing hash for the received RSA-based JWT, (ii) using the header and payload segments of the received RSA-based JWT to generate another version of the signing hash, and then (iii) comparing the decrypted signing hash of the received RSA-based JWT to the generated signing hash to determine whether they match. In this respect, if the signing hashes match one another and the other information included within the header and/or payload segments of the received RSA-based JWT are also valid (e.g., expiration time, scopes, audience, issuance time, etc.), the second-factor authentication of the client application 204a will succeed, whereas if the signing hashes do not match one another or certain of the other information included within the header and/or payload segments of the received RSA-based JWT cannot be validated, the second-factor authentication of the client application 204a will fail. Notably, this type of second authentication factor provides certain security benefits relative to the other types of second authentication factors, including data integrity and non-repudiation.

The OAuth token endpoint's second-factor authentication of the client application 204a factor may take other forms as well.

As part of the first-factor and/or second-factor authentication, the OAuth token endpoint 210 may also interact with the API portal 206 in order to (i) confirm that the client application 204a has approval to access resources exposed by the API 202a and (ii) obtain the client application's scope(s) for the API 202a, among other possibilities.

If the client application 204a is successfully authenticated based on both the first authentication factor and the second authentication factor, then at steps 275-276, the OAuth token endpoint 210 may (i) generate an access token that represents an authorization for the client application 204a to access certain resources that are exposed by the API 202a and (ii) cause the generated access token to be sent from the OAuth token endpoint 210 running on the OAuth authorization server back to the client application 204a running on the API consumer's computing system. In practice, this generated access token may take various forms, examples of which may include a JWT type of access token (which may be encoded with a given set of token information) or an opaque type of access token (which may be cross-referenced with a given set of token information), among other possibilities.

As shown at step 277, the client application 204a may receive the access token that was generated by the OAuth token endpoint 210. In turn, at step 278, client application 204a may (i) generate an API request to access one or more resources that are hosted by the API provider's resource server 214 and exposed by the API 202a, where the request includes the access token provided by the OAuth token endpoint 210, and then (ii) cause that API request to be sent from the API consumer's computing system to the OAuth resource endpoint 212 running on the computing system serving as the proxy for the API 202a.

As shown at step 279, the OAuth resource endpoint 212 may receive the API request from the client application 204a, which as noted above includes the access token. In turn, at step 280, the OAuth resource endpoint 212 may validate the access token. In line with the discussion above, this function of validating the access token may take various forms, which may depend in part on the form of the access token (e.g., whether the access token comprises a JWT type of token, an opaque type of token, or some other type of token). For instance, in an implementation where the access token comprises a JWT type of token that was signed by the OAuth token endpoint 210, the function of validating the access token may involve verifying the signature of the JWT and perhaps also verifying other claims included within the JWT token (e.g., scopes, expiration time, audience, issuance time, etc.). Alternatively, in an implementation where the access token comprises an opaque type of token, the function of validating the access token may involve interacting with an introspection endpoint on the OAuth authorization server to obtain token information corresponding to the opaque token and then verifying certain aspects of that information (e.g., active state, scopes, expiration time, audience, issuance time, etc.). The function of validating the access token may take other forms as well.

However, unlike in the first embodiment described above with reference to FIG. 2B, the OAuth resource endpoint 212 is not extended to perform a second-factor authentication of the client application 204a, because in this second embodiment, it is the OAuth token endpoint 210 that is extended to perform the second-factor authentication of the client application 204a.

If the access token is successfully validated by the OAuth resource endpoint 212, then at step 281, the OAuth resource endpoint 212 may authorize the API request and relay the API request to the resource server 214, and at step 282, the resource server 214 may send an API response back to the client application 204a (via the OAuth resource endpoint 212) that provides the client application 204a with the requested access to the one or more resources. On the other hand, if the access token cannot be successfully validated by the OAuth resource endpoint 212, the OAuth resource endpoint 212 may deny the API request and send an API response back to the client application 204a indicating that the API request has been denied.

The process 270 for authenticating and authorizing the client application 204a to access one or more resources exposed by the API 202a of the API provider 202 in accordance with the second embodiment of the disclosed two-factor authentication technology could take various other forms as well. For instance, while the second embodiment of the disclosed two-factor authentication technology is described above in the context of an example implementation of the OAuth 2.0 framework that utilizes a client credentials grant type, this second embodiment of the disclosed two-factor authentication technology may be applicable to any implementation of the OAuth 2.0 framework involving an OAuth token endpoint configured to issue access tokens that are subsequently validated by an OAuth resource endpoint, including but not limited to implementations of the OAuth 2.0 framework that utilize an authorization code or resource owner password credentials grant type. In such implementations, the OAuth token endpoint may be extended in accordance with the disclosed technology in order to issue access tokens based not only on validation of a first authentication factor for a client that is included in the client's token request, but also on validation of a given type of second authentication factor for the client that is included in the client's token request. Advantageously, each of the two embodiments described above enhances the security of the OAuth 2.0 framework by incorporating two-factor authentication into the flow by which the client application 204a requests access to resources exposed by the API 202a, albeit in different ways. In this respect, the first and second embodiments may each have their own respective advantages, which may be balanced by an API provider when deciding which of the embodiments to implement. For instance, by performing the second-factor authentication at the OAuth resource endpoint when a new API request is received, the first embodiment may provide an increased level of security relative to the second embodiment, because a new iteration of the second-factor authentication will be performed for every API request. In this way, the first embodiment is capable of protecting against a scenario where the approval status of the client application changes after the access token is issued by the OAuth token endpoint. Additionally, by configuring different endpoints to carry out the two different authentications, the first embodiment may further decrease the possibility of a bad actor gaining authorized access to the resources exposed by the API 202a. On the other hand, by consolidating the first-factor and second-factor authentications of the client application 204a at the OAuth token endpoint, the second embodiment may be easier for API providers to implement and may also provide two-factor authentication in a manner that is quicker and requires less compute resources than the first embodiment. The first and second embodiments may also have respective advantages as well.

In accordance with the present disclosure, the above-described embodiments of the disclosed two-factor authentication technology could also optionally be further extended in any of various ways in order to further enhance security.

For instance, as one possible extension, the client application 204a may be configured such that, along with generating and sending the API request to the OAuth resource endpoint 212, the client application 204a may also generate and send a signed hash of the entire API request, and the OAuth resource endpoint 212 may correspondingly be configured to use the signed hash for the API request to validate the integrity of the API request. The signed hash of the API request that is generated by the client application 204a and used to validate the integrity of the API request in accordance with this extension could take any of various forms.

As one example, the signed hash of the API request may comprise a hash that is signed with a shared secret that is possessed by both the client application 204a and the OAuth resource endpoint 212 using an HMAC algorithm or the like—which could be the same shared secret being used as the second-factor credential information for the client application 204a or some other shared secret that is utilized for purposes of validating the integrity of the client application's API requests. In this example, the OAuth resource endpoint 212 may validate the signed hash for the API request that is received from the client application 204a—and thereby validate the integrity of the API request—by (i) generating a hash of the API request using the same hashing algorithm used by the client application 204a, (ii) signing the generated hash with the shared secret that is possessed by the OAuth resource endpoint 212 using the same HMAC algorithm (or the like) used by the client application 204a, (iii) comparing the signed hash received from the client application 204a to the signed hash generated by the OAuth resource endpoint 212 to determine whether they match, and (iv) if the signed hashes do match, continuing to process the API request in the manner described above.

As another example, the signed hash of the API request may comprise a hash that is signed with a private key of a public-private key pair for the client application 204a using an RSA algorithm or the like and validated with a corresponding public key of the public-private key pair that is possessed by the OAuth resource endpoint 212. In this respect, the public-private key pair used to generate the signed hash could be the same public-private key pair being used as the second-factor credential information for the client application 204a, or it could be some other public-private key pair that is utilized for purposes of validating the integrity of the client application's API requests. In this respect, as with the public-private key pair being used as the second-factor credential information for the client application 204a, the public-private key pair used to generate the signed hash may comprise public-private key pair that is generated by the API consumer 204 in accordance with the PKI, which may provide non-repudiation protection in addition to data integrity protection. In this example, the OAuth resource endpoint 212 may then validate the signed hash for the API request that is received from the client application 204a—and thereby validate the integrity (and perhaps also the non-repudiation) of the API request—by (i) generating a hash of the API request using the same hashing algorithm used by the client application 204a, (ii) using the public key of the public-private key pair (which is possessed by the OAuth resource endpoint 212) to decrypt the signed hash received from the client application 204a, (iii) comparing the decrypted version of the signed hash that was received from the client application 204a to the hash that was generated by the OAuth resource endpoint 212 to determine whether they match, and (iv) if the hashes do match, continuing to process the API request in the manner described above.

The signed hash of the API request that is generated by the client application 204a and used to validate the integrity of the API request in accordance with this extension could take other forms as well.

Further, instead of generating and sending a signed hash of the entire API request, the client application 204a could generate a digest-type of hash of the entire API request using SHA256, SHA512, or the like, which could also be used to validate the integrity of the API request.

As another possible extension, the OAuth resource endpoint 212 may be configured such that, along with sending the API response back to the client application 204a, the OAuth resource endpoint 212 may also generate and send a signed hash of the entire API response, and the client application 204a may correspondingly be configured to use the signed hash for the API response to validate the integrity of the API response. The signed hash of the API response that is generated by the OAuth resource endpoint 212 and used to validate the integrity of the API response in accordance with this extension could take any of various forms.

As one example, the signed hash of the API response may comprise a hash that is signed with a shared secret that is possessed by both the OAuth resource endpoint 212 and the client application 204a and using an HMAC algorithm or the like—which could be the same shared secret being used as the second-factor credential information for the client application 204a or some other shared secret that is utilized for purposes of validating the integrity of the OAuth resource endpoint's API responses. In this example, the client application 204a may validate the signed hash for the API request that is received from the OAuth resource endpoint 212—and thereby validate the integrity of the API response—by (i) generating a hash of the API response using the same hashing algorithm used by the OAuth resource endpoint 212, (ii) signing the generated hash with the shared secret that is possessed by the client application 204a using the same HMAC algorithm (or the like) used by the OAuth resource endpoint 212, (iii) comparing the signed hash received from the OAuth resource endpoint 212 to the signed hash generated by the client application 204a to determine whether they match, and (iv) if the signed hashes do match, continuing to process the API response.

As another example, the signed hash of the API response may comprise a hash that is signed with a private key of a public-private key pair for the OAuth resource endpoint 212 using an RSA algorithm or the like and validated with a corresponding public key of the public-private key pair that is possessed by the client application 204a. In this example, the client application 204a may validate the signed hash for the API response that is received from the OAuth resource endpoint 212—and thereby validate the integrity of the API response—by (i) generating a hash of the API response using the same hashing algorithm used by the OAuth resource endpoint 212, (ii) using the public key of the public-private key pair (which is possessed by the client application 204a) to decrypt the signed hash received from the OAuth resource endpoint 212, (iii) comparing the decrypted version of the signed hash that was received from the OAuth resource endpoint 212 to the hash that was generated by the client application 204a to determine whether they match, and (iv) if the hashes do match, continuing to process the API response.

The signed hash of the API request that is generated by the client application 204a and used to validate the integrity of the API request in accordance with this extension could take other forms as well.

Further, instead of generating and sending a signed hash of the entire API response, the OAuth resource endpoint 212 may could generate a digest-type of hash of the entire API response using SHA256, SHA512, or the like, which could also be used to validate the integrity of the API response.

The above-described embodiments of the disclosed two-factor authentication technology could optionally be further extended in other ways as well.

Further, in accordance with the present disclosure, the functional entities described above may be implemented within a computing environment in any of various ways. For instance, in one possible implementation of a computing environment in which the disclosed technology may be practiced, the API portal 206, the first-factor and second-factor credentials managers 208a and 208b, the OAuth token endpoint 210, and the OAuth resource endpoint 212 may all be hosted within the computing platform of the API provider 202 along with the resource server 214, whereas the client application 204a may be hosted within a separate computing platform of the API consumer 204. In this respect, the API portal 206, the first-factor and second-factor credentials managers 208a and 208b, the OAuth token endpoint 210, the OAuth resource endpoint 212, and the resource server 214 could each be implemented on a separate computing system (e.g., a separate server) within the computing platform of the API provider 202, or alternatively, certain of these entities could be implemented on a same computing system (e.g., a same server) within the computing platform of the API provider 202.

As another possible implementation of a computing environment in which the disclosed technology may be practiced, in addition to the API portal 206, the first-factor and second-factor credentials managers 208a and 208b, the OAuth token endpoint 210, and the OAuth resource endpoint 212 being hosted within the computing platform of the API provider 202 along with the resource server 214, the client application 204a may also be hosted within the computing platform of the API provider 202.

As yet another possible implementation of a computing environment in which the disclosed technology may be practiced, one or more of the API portal 206, the first-factor credentials manager 208a, the second-factor credentials manager 208b, the OAuth token endpoint 210, and/or the OAuth resource endpoint 212 may be implemented within a computing platform of a third-party organization that is providing this functionality on behalf of the API provider 202.

As one example of such an implementation, the API portal 206, the first-factor and second-factor credentials managers 208a and 208b, the OAuth token endpoint 210, and the OAuth resource endpoint 212 may each be hosted within a computing platform of a third-party organization such as a third-party API orchestrator, which may be federated with the computing platform of the API provider 202 that comprises the resource server 214.

As another example of such an implementation, the API portal 206 and the first-factor and second-factor credentials managers 208a and 208b may each be hosted within a computing platform of a third-party organization such as a third-party API orchestrator, whereas the OAuth token endpoint 210 and the OAuth resource endpoint 212 may be hosted within the computing platform of the API provider 202 along with the resource server 214.

As yet another example of such an implementation, one or both of the first-factor credentials manager 208a or the second-factor credentials manager 208b may be hosted within a computing platform of a third-party organization that is providing client-credential management services, whereas the API portal 206, the OAuth token endpoint 210, and the OAuth resource endpoint 212 may be hosted within the computing platform of either the API provider 202 or a different third-party organization such as a third-party API orchestrator.

Other possible arrangements of the API portal 206, the OAuth token endpoint 210, and the OAuth resource endpoint 212 are possible as well.

Figure 3:
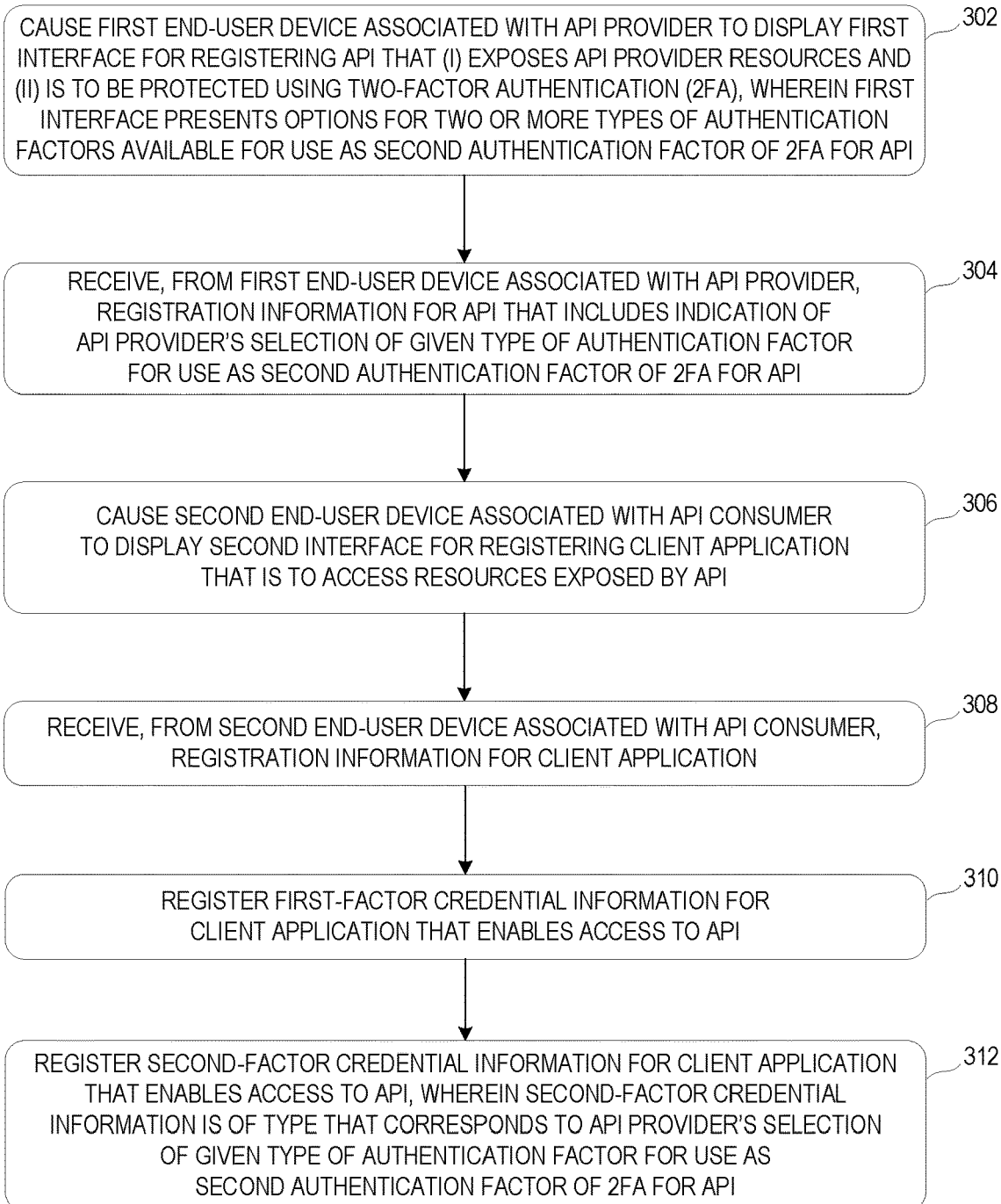
FIG. 3 depicts a flow chart of example operations that may be carried out during one example implementation of a registration process in accordance with the disclosed two-factor authentication technology.
Figure 4:
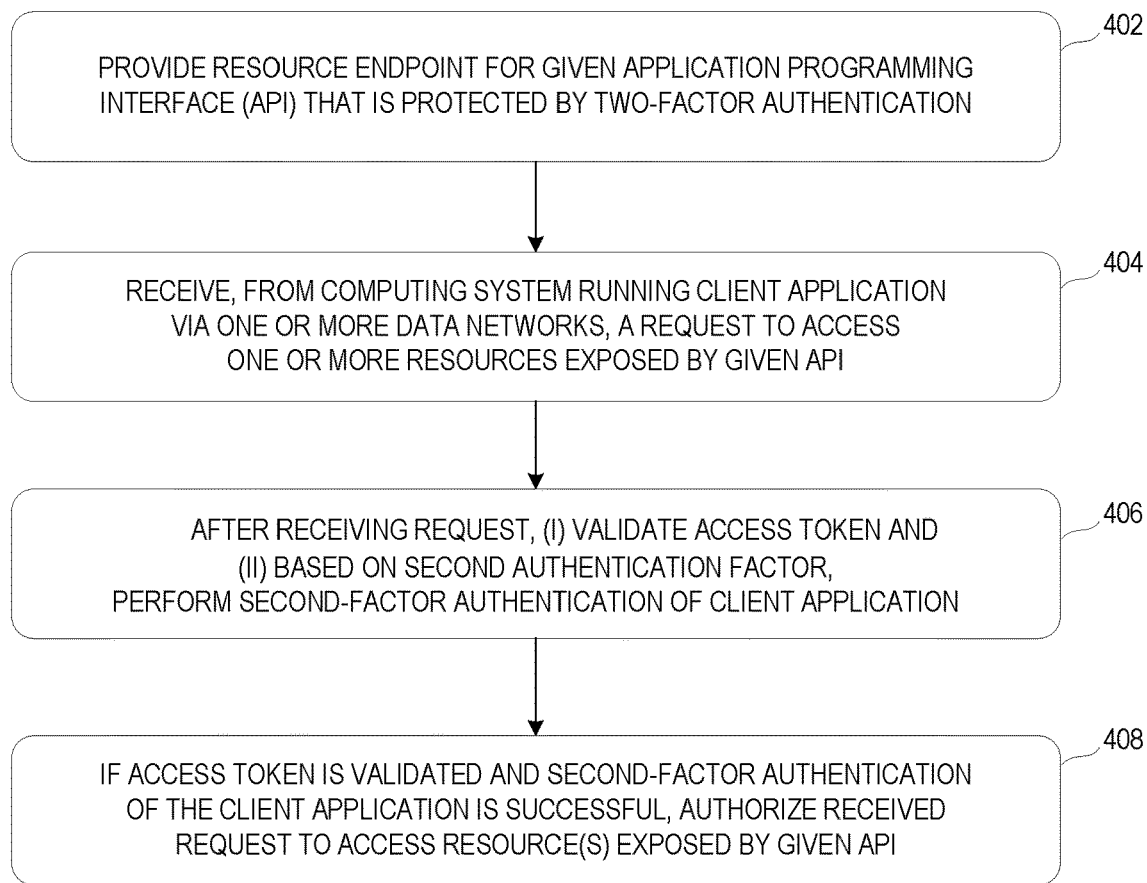
FIG. 4 depicts a flow chart of example operations that may be carried out during one example implementation of an authentication and authorization process in accordance with the disclosed two-factor authentication technology.
Figure 5:
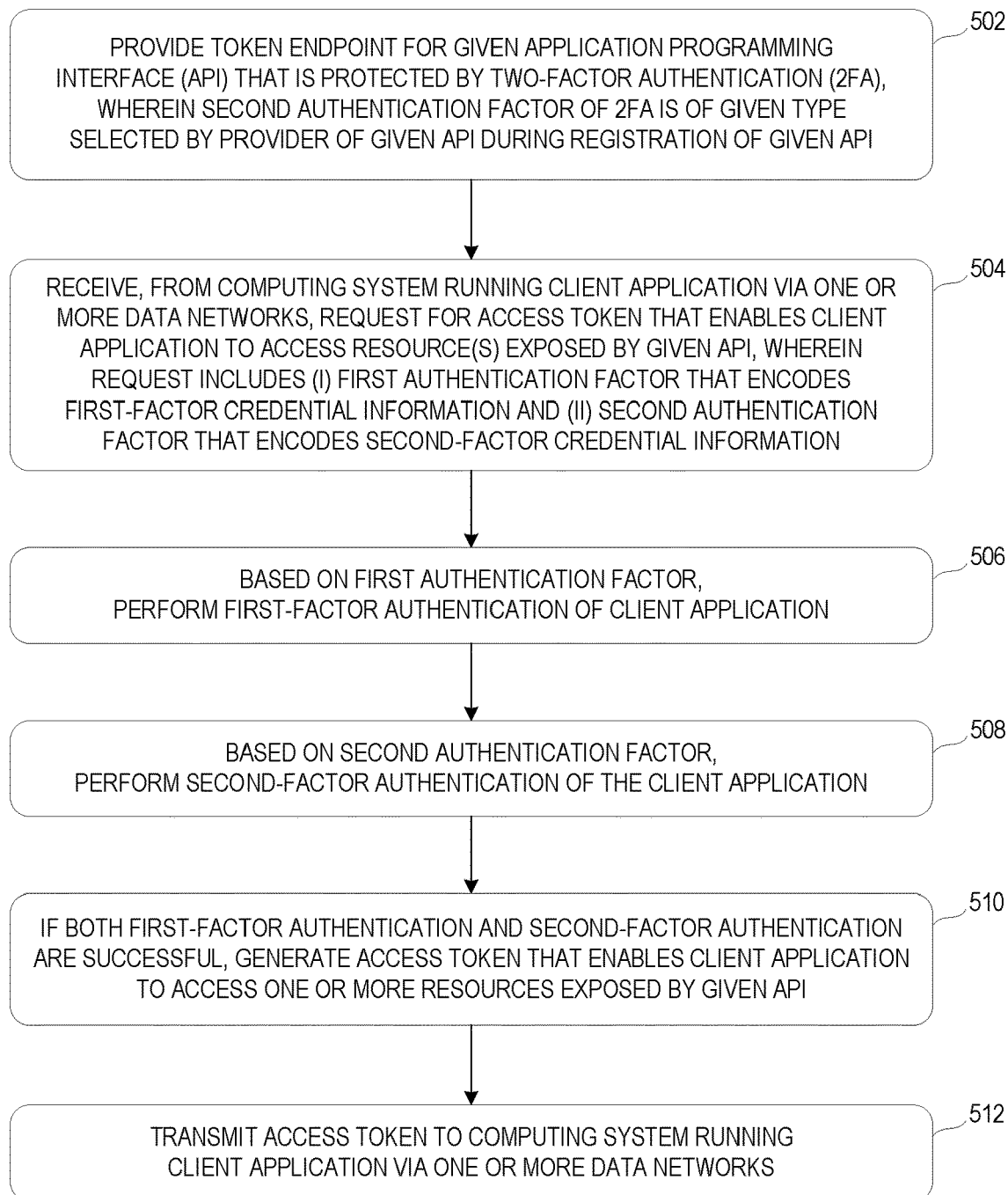
FIG. 5 depicts a flow chart of example operations that may be carried out during another example implementation of an authentication and authorization process in accordance with the disclosed two-factor authentication technology.

Turning now to FIGS. 3, 4, and 5, flowcharts depicting example operations of example processes that may be carried out in accordance with the disclosed registration and authentication and authorization techniques are shown. The example processes 300, 400, and 500 may include one or more operations, functions, or actions as illustrated by one or more of blocks 302-312, 402-408, and 502-512, respectively. Although blocks 302-312, 402-408, and 502-512 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example processes 300, 400, and 500, each respective flowchart shows functionality and operation of one possible implementation of embodiments described herein. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable medium may also be any other volatile or non-volatile storage system. The computer-readable medium may be considered a computer-readable storage medium, for example, or a tangible storage device. In addition, for the example processes 300, 400, and 500, each block shown in FIGS. 3, 4, and 5 may represent circuitry that is wired to perform the specific logical functions in the process.

In line with the discussion above, for the examples that follow, the example processes 300, 400, and 500 may be carried out by one or more back-end computing platforms that are configured to run the disclosed software technology, such as any one or more of the computing platforms discussed above with reference to FIG. 2A, 2B, or 2C (e.g., an API portal, an OAuth resource endpoint, an OAuth token endpoint, etc.).

FIG. 3 depicts an example process 300 for registering APIs and client applications in accordance with the disclosed two-factor authentication extension techniques. In line with the discussion above with reference to FIG. 2A, the example process 300 may be carried out by a computing platform that is configured to facilitate registration of APIs and client applications that are to utilize the OAuth 2.0 framework in order to govern access to API-exposed resources. In practice, the example process 300 may be initiated when a representative of an API provider interacts with the computing platform, via a first end-user device associated with the API provider, to initiate registration of an API that exposes resources hosted by the API provider.

At block 302, the computing platform may cause the first end-user device to display a first interface for registering the API that (i) exposes resources of the API provider and (ii) is to be protected using two-factor authentication, wherein the first interface presents a set of options for two or more types of authentication factors that are available for use as a second authentication factor of the two-factor authentication for the API. In line with the discussion above, the types of authentication factors may take various forms. Further, the types of authentication factors may be selectable to enable the API provider (e.g., the representative of the API provider) to provide an input via the first interface to select a given type of authentication factor that is to be used as the second authentication factor of the two-factor authentication for the API.

At block 304, the computing platform may receive, from the first end-user device associated with the API provider, registration information for the API that includes an indication of the API provider's selection of the given type of authentication factor that is to be used as the second authentication factor of the two-factor authentication for the API. In turn, the computing platform may store a data record for the newly registered API.

Further, the computing platform may receive a request to initiate registration for a client application of an API consumer that will call the registered API to access one or more resources exposed by the API. In line with the discussion above, the request to initiate registration for the client application may involve a representative of the API consumer interacting with the computing platform via a second end-user device. At block 306, the computing platform may cause the second end-user device associated with the API consumer to display a second interface for registering the client application that is to access resources exposed by the API.

At block 308, the computing platform may receive, from the second end-user device associated with the API consumer, registration information for the client application, which may include, in line with the discussion above, identifying information for the client application, an identification of the API to be accessed, and/or certain configuration settings for the client application.

At block 310, the computing platform may register first-factor credential information for the client application that enables access to the API. In line with the discussion above, the first-factor credential information may be used to carry out a first-factor authentication of the client application when it attempts to access resources via the API.

At block 312, the computing platform may register second-factor credential information for the client application that enables access to the API, wherein the second-factor credential information is of a type that corresponds to the API provider's selection of the given type of authentication factor that is to be used as the second authentication factor of the two-factor authentication for the API. The second-factor credential information may then be used to carry out a second-factor authentication of the client application when it attempts to access resources via the API. In line with the discussion above, the computing platform may cause one or both of the first-factor or second-factor credential information to be provided to the API consumer. Further, the computing platform may store a data record for the registered client application.

FIG. 4 depicts an example process 400 for implementing the disclosed two-factor authentication extension techniques according to an embodiment in which a resource endpoint is extended to perform a second-factor authentication of a client application seeking to access resources exposed by a given API. In line with the discussion above with reference to FIG. 2B, the example process 400 may be carried out by a computing platform that is configured to host one or more software systems (e.g., resource endpoint, token endpoint, resource server, etc.) for governing access to API-exposed resources.

The example process 400 may begin at block 402, where the computing platform may provide a resource endpoint for a given API that is protected by two-factor authentication. The given API may be, for instance, the API that was registered during the example process 300 shown in FIG. 3. At block 404, the computing platform may receive, from a computing system running a client application via one or more data networks, a request to access one or more resources exposed by the given API. The request may include (i) an access token that was previously issued to the client application as a result of a successful first-factor authentication of the client application (e.g., as discussed above with reference to step 253 of FIG. 2B), and (ii) a second authentication factor that encodes second-factor credential information for the client application, wherein the second authentication factor is of a given type that was selected by a provider of the given API during registration of the given API. The second authentication factor may have been selected from a set of options for two or more types of authentication factors that were presented to the provider as being available for use as the second authentication factor of the two-factor authentication for the given API.

At block 406, after receiving the request to access the one or more resources exposed by the given API, the computing platform may (i) validate the access token and (ii) based on the second authentication factor, perform a second-factor authentication of the client application. In line with the discussion above, the function of validating the access token may take various forms, which may depend in part on the form of the access token. The function of performing the second-factor authentication may also take various forms, which may depend on the type of second authentication factor selected for the API.

If (i) the access token is validated and (ii) the second-factor authentication of the client application is successful, at block 408, the computing platform may authorize the received request from the computing system running the client application to access the one or more resources exposed by the given API.

FIG. 5 depicts an example process 500 for implementing the disclosed two-factor authentication extension techniques according to an embodiment in which a token endpoint is extended to perform a second-factor authentication of a client application seeking to access resources exposed by a given API. In line with the discussion above with reference to FIG. 2C, the example process 500 may be carried out by a computing platform that is configured to host one or more software systems (e.g., resource endpoint, token endpoint, resource server, etc.) for governing access to API-exposed resources.

The example process 500 may begin at block 502, where the computing platform may provide a token endpoint for a given API that is protected by two-factor authentication, wherein a second authentication factor of the two-factor authentication is of a given type that was selected by a provider of the given API during registration of the given API. Further, the given type of second authentication factor may have been selected from a set of options for two or more types of authentication factors that were presented to the provider as being available for use as the second authentication factor of the two-factor authentication for the given API. The given API may be, for instance, the API that was registered during the example process 300 shown in FIG. 3.

At block 504, the computing platform may receive, from a computing system running a client application via one or more data networks, a request for an access token that enables the client application to access one or more resources exposed by the given API. The request may include (i) a first authentication factor that encodes first-factor credential information for the client application and (ii) a second authentication factor that encodes second-factor credential information for the client application. In line with the discussion above, the manner in which the first-factor credential information and the second-factor credential information are encoded into the first authentication factor and the second authentication factor, respectively, may take various forms. For instance, the manner in which the second-factor credential information is encoded into the second authentication factor may depend on the type of second authentication factor that was selected for the API.

At block 506, the computing platform may perform a first-factor authentication of the client application based on the first authentication factor. In line with the discussion above, this function may involve validating the first authentication factor, which may take various forms depending on the form of the first authentication factor.

At block 508, the computing platform may perform a second-factor authentication of the client application based on the second authentication factor. In line with the discussion above, this function may involve validating the second authentication factor, which may take various forms depending on the form of the second authentication factor.

Further, in line with the discussion above, as part of performing the first-factor and/or second-factor authentication, the computing platform may (i) confirm that the client application has approval to access resources exposed by the API and (ii) obtain the client application's scope of access for the API.

At block 510, if both the first-factor authentication and the second-factor authentication are successful, the computing platform may generate the access token that enables the client application to access the one or more resources exposed by the given API. At block 512, the computing platform may then cause the access token to be transmitted to the computing system running the client application via the one or more data networks.

Figure 6:
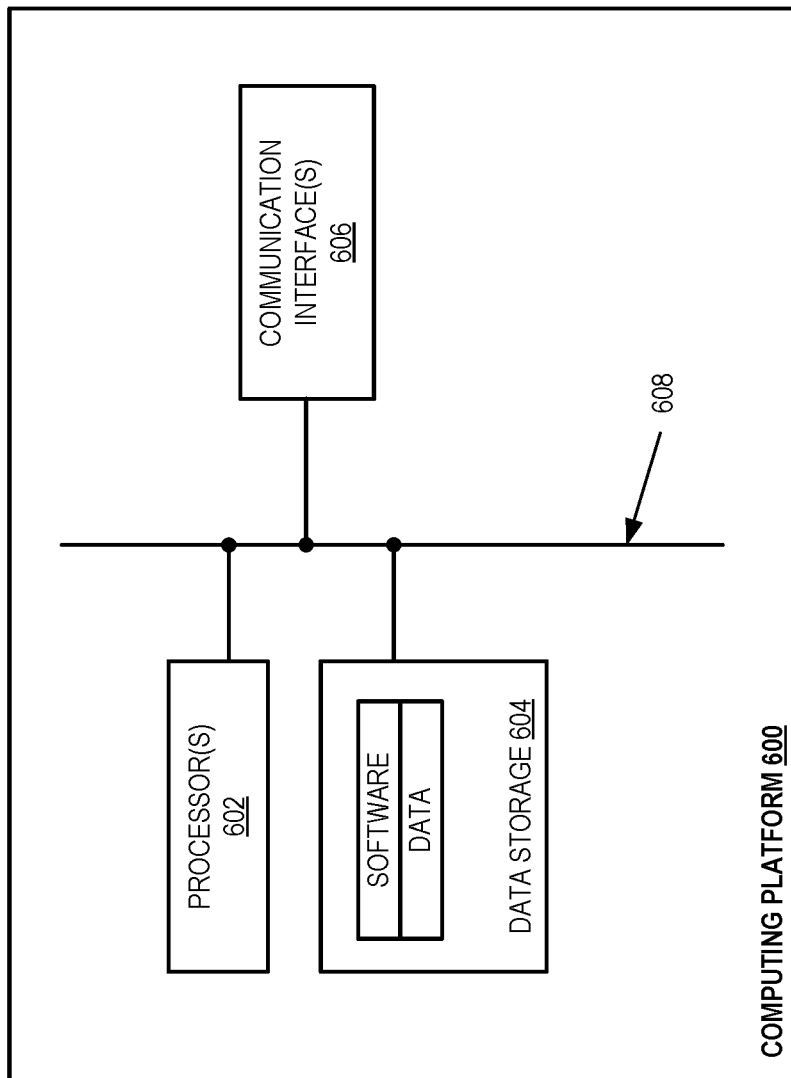
FIG. 6 depicts example structural components of an example computing platform that is configured to carry out functionality in accordance with the disclosed technology.

Turning now to FIG. 6, a simplified block diagram is provided to illustrate some structural components that may be included in an example computing platform 600 that may be configured to carry out any of the various functions disclosed herein, including but not limited to the functions of any one or more of the client application 204a, the API portal 206, the first-factor credentials manager 208a, the second-factor credentials manager 208b, the OAuth token endpoint 210, the OAuth resource endpoint 212, and/or the resource server 214. At a high level, the example computing platform 600 may generally comprise any one or more computing systems that collectively include one or more processors 602, data storage 604, and one or more communication interfaces 606, all of which may be communicatively linked by a communication link 608 that may take the form of a system bus, a communication network such as a public, private, or hybrid cloud, or some other connection mechanism. Each of these components may take various forms.

The one or more processors 602 may each comprise one or more processing components, such as general-purpose processors (e.g., a single- or a multi-core central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that the one or more processors 602 could comprise processing components that are distributed across a plurality of physical computing systems connected via a network.

In turn, the data storage 604 may comprise one or more non-transitory computer-readable storage mediums that are collectively configured to store (i) program instructions that are executable by one or more processors 602 such that computing platform 600 is configured to perform any of the various functions disclosed herein, and (ii) data that may be received, derived, or otherwise stored, for example, in one or more databases, file systems, repositories, or the like, by computing platform 600, in connection with performing any of the various functions disclosed herein. In this respect, the one or more non-transitory computer-readable storage mediums of the data storage 604 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing systems connected via a network.

Figure 7:
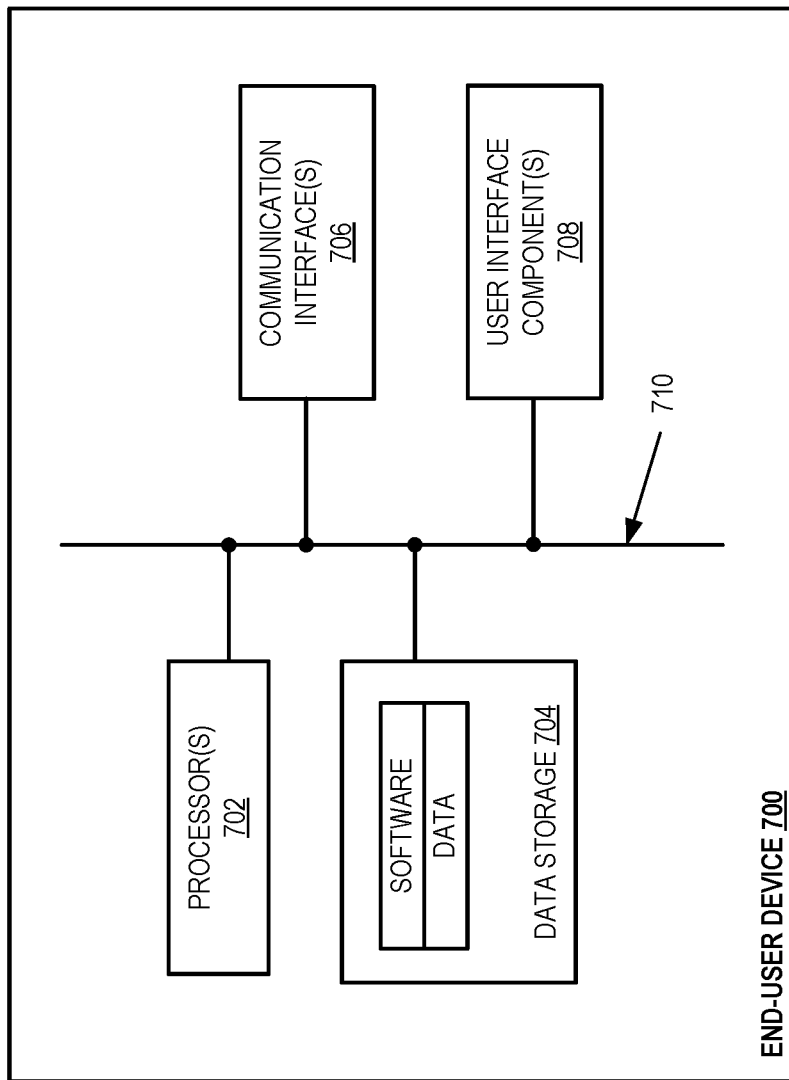
FIG. 7 depicts example structural components of an example end-user device that is configured to carry out functionality in accordance with the disclosed technology.

The one or more communication interfaces 606 may be configured to facilitate wireless and/or wired communication with other systems and/or devices, such as end-user devices (e.g., one or more end-user devices 700 of FIG. 7). Additionally, in an implementation where the computing platform 600 comprises a plurality of physical computing systems connected via a network, the one or more communication interfaces 606 may be configured to facilitate wireless and/or wired communication between these physical computing systems (e.g., between computing and storage clusters in a cloud network). As such, the one or more communication interfaces 606 may each take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

Although not shown, the computing platform 600 may additionally include or have an interface for connecting to one or more user-interface components that facilitate user interaction with the computing platform 600, such as a keyboard, a mouse, a trackpad, a display screen, a touch-sensitive interface, a stylus, a virtual-reality headset, and/or one or more speaker components, among other possibilities.

It should be understood that the computing platform 600 is one example of a computing platform that may be used with the embodiments described herein. Numerous other arrangements are possible and contemplated herein. For instance, in other embodiments, the computing platform 600 may include additional components not pictured and/or more or fewer of the pictured components.

Turning next to FIG. 7, a simplified block diagram is provided to illustrate some structural components that may be included in an example end-user device 700, such as an end-user device used by a representative of the API provider 202 or the API consumer 204 during the registration process described above in connection with FIG. 2A. As shown in FIG. 7, the end-user device 700 may include one or more processors 702, data storage 704, one or more communication interfaces 706, and one or more user-interface components 708, all of which may be communicatively linked by a communication link 410 that may take the form of a system bus or some other connection mechanism. Each of these components may take various forms.

The one or more processors 702 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 704 may comprise one or more non-transitory computer-readable storage mediums that are collectively configured to store (i) program instructions that are executable by the processor(s) 702 such that the end-user device 700 is configured to perform certain functions related to interacting with and accessing services provided by a computing platform, and (ii) data that may be received, derived, or otherwise stored, for example, in one or more databases, file systems, repositories, or the like, by the end-user device 700, related to interacting with and accessing services provided by a computing platform. In this respect, the one or more non-transitory computer-readable storage mediums of the data storage 704 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. The data storage 704 may take other forms and/or store data in other manners as well.

The one or more communication interfaces 706 may be configured to facilitate wireless and/or wired communication with other computing devices. The communication interface(s) 706 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 700 may additionally include or have interfaces for one or more user-interface components 708 that facilitate user interaction with the end-user device 700, such as a keyboard, a mouse, a trackpad, a display screen, a touch-sensitive interface, a stylus, a virtual-reality headset, and/or one or more speaker components, among other possibilities.

It should be understood that the end-user device 700 is one example of an end-user device that may be used to interact with an example computing platform as described herein. Numerous other arrangements are possible and contemplated herein. For instance, in other embodiments, the end-user device 700 may include additional components not pictured and/or more or fewer of the pictured components.

CONCLUSION

This disclosure makes reference to the accompanying figures and several example embodiments of the disclosed innovations that have been described above. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A computing platform comprising:
   at least one network interface;
   at least one processor;
   at least one non-transitory computer-readable medium; and
   program instructions stored on the at least one non-transitory computer-readable medium that are executable by the at least one processor such that the computing platform is configured to:
   provide a resource endpoint for a given application programming interface (API) that is protected by two-factor authentication;
   receive, from a computing system running a client application via one or more data networks, a request to access one or more resources exposed by the given API, wherein the request includes (i) an access token that was previously issued to the client application as a result of a successful first-factor authentication of the client application, and (ii) a second authentication factor that encodes second-factor credential information for the client application, wherein the second authentication factor is a JSON (JavaScript Object Notation) web token (JWT) of a given type that was selected by a provider of the given API during registration of the given API from a set of options for two or more types of authentication factors that were presented to the provider as being available for use as the second authentication factor of the two-factor authentication for the given API;

after receiving the request:
  validate the access token; and
  based on the second authentication factor, perform a second-factor authentication of the client application; and
if the access token is validated and the second-factor authentication of the client application is successful, authorize the received request to access the one or more resources exposed by the given API.

2. The computing platform of claim 1, wherein first-factor credential information for the client application comprises a first-factor secret for the client application and the second-factor credential information comprises a second-factor secret for the client application, and wherein the first-factor secret for the client application is persisted whereas the second-factor secret for the client application is vaultless.

3. The computing platform of claim 1, wherein the set of options for the two or more types of authentication factors that are available for use as the second authentication factor of the two-factor authentication for the API comprise two or more of (i) a hash of a shared secret for the client application, (ii) a JWT that is to be signed using a symmetric signing algorithm and a shared secret for the client application, or (iii) a JWT that is to be signed using an asymmetric signing algorithm and a private key of a public-private key pair for the client application.

4. The computing platform of claim 1, wherein the JWT of the given type has a header segment, a payload segment, and a signature segment that is to be generated using a symmetric signing algorithm and a previously-registered shared secret for the client application, and wherein the program instructions that are executable by the at least one processor such that the computing platform is configured to perform the second-factor authentication of the client application comprise program instructions that are executable by the at least one processor such that the computing platform is configured to:
  extract the header segment of the JWT, the payload segment of the JWT, and the signature segment of the JWT from the request;
  obtain the previously-registered shared secret for the client application;
  use the extracted header segment of the JWT, the extracted payload segment of the JWT, and the previously-registered shared secret to generate another signature segment; and
  compare the extracted signature segment of the JWT to the generated signature segment to determine if they match.

5. The computing platform of claim 4, wherein the previously-registered shared secret for the client application is vaultless, and wherein the program instructions that are executable by the at least one processor such that the computing platform is configured to obtain the previously-registered shared secret comprise program instructions that are executable by the at least one processor such that the computing platform is configured to:
  request that a second-factor credentials manager algorithmically re-generate the previously-registered shared secret for the client application.

6. The computing platform of claim 1, wherein the JWT of the given type has a header segment, a payload segment, and a signature segment that is to be generated using an asymmetric signing algorithm and a private key of a public-private key pair for the client application, and wherein program instructions that are executable by the at least one processor such that the computing platform is configured to perform the second-factor authentication of the client application comprise program instructions stored on the at least one non-transitory computer-readable medium that are executable by the at least one processor such that the computing platform is configured to:
  extract the header segment of the JWT, the payload segment of the JWT, and the signature segment of the JWT from the request;
  obtain a public key of the public-private key pair for the client application;
  use the obtained public key to decrypt the extracted signature segment of the JWT and thereby produce a decrypted signing hash for the JWT;
  use the extracted header segment of the JWT, the extracted payload segment of the JWT, and the obtained shared secret to generate another signing hash; and
  compare the decrypted signing hash to the generated signing hash to determine if they match.

7. The computing platform of claim 6, wherein the program instructions that are executable by the at least one processor such that the computing platform is configured to obtain the public key comprise program instructions that are executable by the at least one processor such that the computing platform is configured to:
  retrieve the public key from a second-factor credentials manager.

8. At least one non-transitory computer-readable medium, wherein the at least one non-transitory computer-readable medium is provisioned with program instructions that, when executed by at least one processor, cause a computing platform to:
  provide a resource endpoint for a given application programming interface (API) that is protected by two-factor authentication;
  receive, from a computing system running a client application via one or more data networks, a request to access one or more resources exposed by the given API, wherein the request includes (i) an access token that was previously issued to the client application as a result of a successful first-factor authentication of the client application, and (ii) a second authentication factor that encodes second-factor credential information for the client application, wherein the second authentication factor is a JSON (JavaScript Object Notation) web token (JWT) of a given type that was selected by a provider of the given API during registration of the given API from a set of options for two or more types of authentication factors that were presented to the provider as being available for use as the second authentication factor of the two-factor authentication for the given API;
  after receiving the request:
    validate the access token; and
    based on the second authentication factor, perform a second-factor authentication of the client application; and
  if the access token is validated and the second-factor authentication of the client application is successful, authorize the received request to access the one or more resources exposed by the given API.

9. The at least one non-transitory computer-readable medium of claim 8, wherein first-factor credential information for the client application comprises a first-factor secret for the client application and the second-factor credential information comprises a second-factor secret for the client application, and wherein the first-factor secret for the client application is persisted whereas the second-factor secret for the client application is vaultless.

10. The at least one non-transitory computer-readable medium of claim 8, wherein the set of options for the two or more types of authentication factors that are available for use as the second authentication factor of the two-factor authentication for the API comprise two or more of (i) a hash of a shared secret for the client application, (ii) a JWT that is to be signed using a symmetric signing algorithm and a shared secret for the client application, or (iii) a JWT that is to be signed using an asymmetric signing algorithm and a private key of a public-private key pair for the client application.

11. The at least one non-transitory computer-readable medium of claim 8, wherein the JWT of the given type has a header segment, a payload segment, and a signature segment that is to be generated using a symmetric signing algorithm and a previously-registered shared secret for the client application, and wherein the program instructions that, when executed by at least one processor, cause the computing platform to perform the second-factor authentication of the client application comprise program instructions that, when executed by at least one processor, cause the computing platform to:
  extract the header segment of the JWT, the payload segment of the JWT, and the signature segment of the JWT from the request;
  obtain the previously-registered shared secret for the client application;
  use the extracted header segment of the JWT, the extracted payload segment of the JWT, and the previously-registered shared secret to generate another signature segment; and
  compare the extracted signature segment of the JWT to the generated signature segment to determine if they match.

12. The at least one non-transitory computer-readable medium of claim 11, wherein the previously-registered shared secret for the client application is vaultless, and wherein the program instructions that, when executed by at least one processor, cause the computing platform to obtain the previously-registered shared secret comprise program instructions that, when executed by at least one processor, cause the computing platform to:
  request that a second-factor credentials manager algorithmically re-generate the previously-registered shared secret for the client application.

13. The at least one non-transitory computer-readable medium of claim 8, wherein the JWT of the given type has a header segment, a payload segment, and a signature segment that is to be generated using an asymmetric signing algorithm and a private key of a public-private key pair for the client application, and wherein the program instructions that, when executed by at least one processor, cause the computing platform to perform the second-factor authentication of the client application comprise program instructions that, when executed by at least one processor, cause the computing platform to:
  extract the header segment of the JWT, the payload segment of the JWT, and the signature segment of the JWT from the request;
  obtain a public key of the public-private key pair for the client application;
  use the obtained public key to decrypt the extracted signature segment of the JWT and thereby produce a decrypted signing hash for the JWT;
  use the extracted header segment of the JWT, the extracted payload segment of the JWT, and the obtained shared secret to generate another signing hash; and
  compare the decrypted signing hash to the generated signing hash to determine if they match.

14. A method carried out by a computing platform, the method comprising:
  providing a resource endpoint for a given application programming interface (API) that is protected by two-factor authentication;
  receiving, from a computing system running a client application via one or more data networks, a request to access one or more resources exposed by the given API, wherein the request includes (i) an access token that was previously issued to the client application as a result of a successful first-factor authentication of the client application, and (ii) a second authentication factor that encodes second-factor credential information for the client application, wherein the second authentication factor is a JSON (JavaScript Object Notation) web token (JWT) of a given type that was selected by a provider of the given API during registration of the given API from a set of options for two or more types of authentication factors that were presented to the provider as being available for use as the second authentication factor of the two-factor authentication for the given API;
  after receiving the request:
    validating the access token; and
    based on the second authentication factor, performing a second-factor authentication of the client application; and
  if the access token is validated and the second-factor authentication of the client application is successful, authorizing the received request to access the one or more resources exposed by the given API.

15. The method of claim 14, wherein first-factor credential information for the client application comprises a first-factor secret for the client application and the second-factor credential information comprises a second-factor secret for the client application, and wherein the first-factor secret for the client application is persisted whereas the second-factor secret for the client application is vaultless.

16. The method of claim 14, wherein the set of options for the two or more types of authentication factors that are available for use as the second authentication factor of the two-factor authentication for the API comprise two or more of (i) a hash of a shared secret for the client application (ii) a JWT that is to be signed using a symmetric signing algorithm and a shared secret for the client application, or (iii) a JWT that is to be signed using an asymmetric signing algorithm and a private key of a public-private key pair for the client application.

* * * * *